United States Patent
Suzuki et al.

(10) Patent No.: US 7,248,772 B2
(45) Date of Patent: Jul. 24, 2007

(54) FLEXIBLE OPTICAL WAVEGUIDE

(75) Inventors: Toshihiko Suzuki, Kanagawa (JP);
Shigemi Ohtsu, Kanagawa (JP); Keishi Shimizu, Kanagawa (JP); Kazutoshi Yatsuda, Kanagawa (JP); Akira Fujii, Kanagawa (JP); Eiichi Akutsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/391,304

(22) Filed: Mar. 29, 2006

(65) Prior Publication Data
US 2007/0025672 A1    Feb. 1, 2007

(30) Foreign Application Priority Data

| Jul. 26, 2005 | (JP) | ............................. 2005-216539 |
| Jul. 26, 2005 | (JP) | ............................. 2005-216540 |

(51) Int. Cl.
*G02B 6/10* (2006.01)

(52) U.S. Cl. ...................... 385/129; 385/146

(58) Field of Classification Search .................. 385/14, 385/39, 88–92, 129–132, 146
See application file for complete search history.

(56) References Cited

U.S. PATENT DOCUMENTS

| 6,801,703 B2 * | 10/2004 | Gao et al. ................... 385/130 |
| 6,990,263 B2 * | 1/2006 | Shimizu et al. ............... 385/14 |
| 2002/0018633 A1 * | 2/2002 | Imaizumi .................... 385/132 |

FOREIGN PATENT DOCUMENTS

| JP | A 2003-207659 | 7/2003 |
| JP | A 2004-029507 | 1/2004 |
| JP | A 2004-086144 | 3/2004 |
| JP | A 2004-109927 | 4/2004 |

* cited by examiner

*Primary Examiner*—Sarah Song
(74) *Attorney, Agent, or Firm*—Oliff & Berridge, PLC

(57) ABSTRACT

A flexible optical waveguide having a core in which light propagates; and a cladding portion with a smaller refractive index than the core, that surrounds the core, wherein the flexible optical waveguide has a flexible portion between both end portions thereof, and at least one end portion of the both end portions is more solid than the flexible portion, is provided, which flexible optical waveguide, while assuring flexibility, can be mounted with high accuracy.

20 Claims, 16 Drawing Sheets

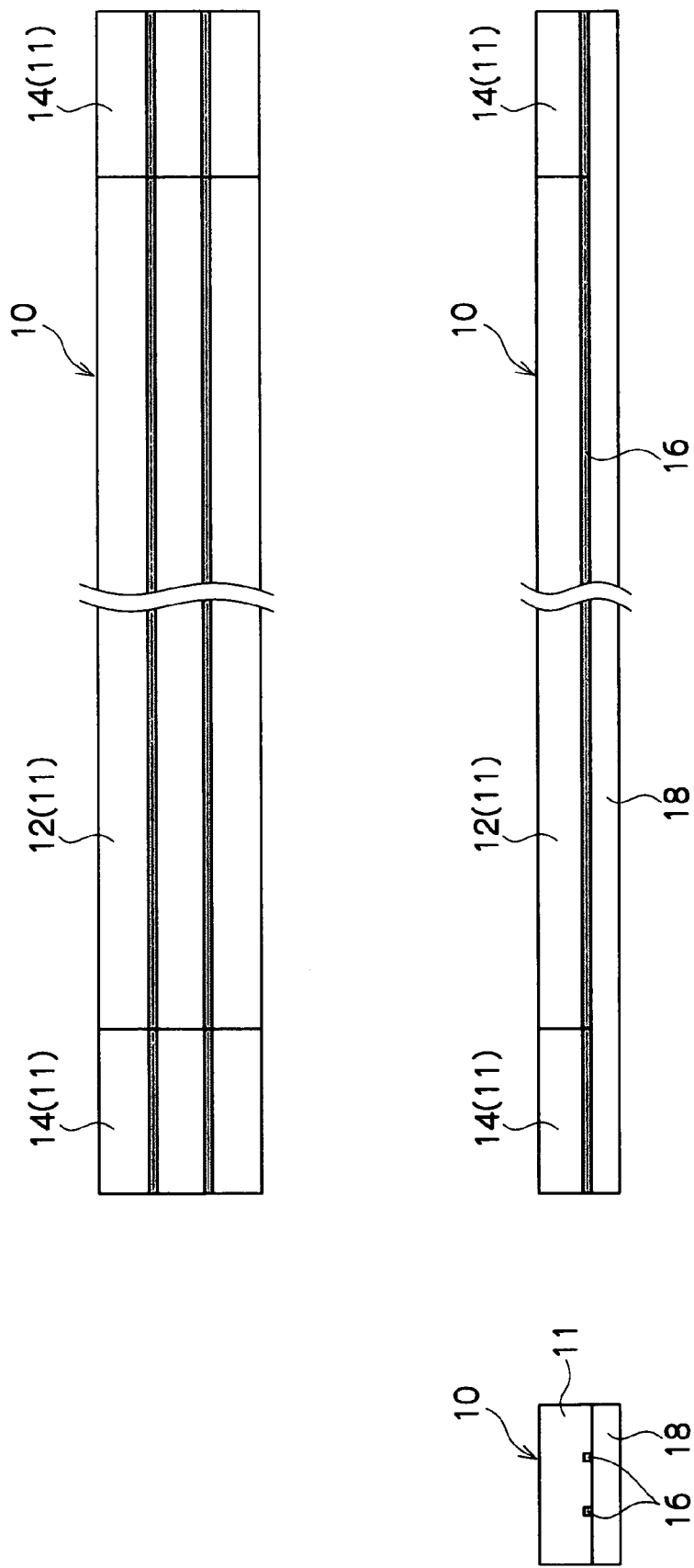

FLEXIBLE OPTICAL WAVEGUIDE

CROSS-REFERENCE TO RELATED APPLICATION

This application claims priority under 35 USC 119 from Japanese Patent Application Nos. 2005-216539 and 2005-216540, the disclosures of which are incorporated by reference herein.

BACKGROUND

1. Technical Field

The present invention relates to a flexible optical waveguide which has the characteristic of following curves and twists, and to a soft flexible optical waveguide which has the characteristic of following curves and twists.

2. Related Art

Heretofore, methods for fabrication of polymer optical waveguides have been proposed, such as: (1) a method of impregnating films with a monomer, selectively exposing a core portion to alter a refractive index, and sticking together the films (the selective polymerization method); (2) a method of coating a core layer and a cladding layer and then using reactive ion etching to form a cladding portion (the RIE method); (3) a method of using an ultraviolet-curable resin in which a photosensitive material has been added into a polymer material, and using a photolithography process for exposure and development (the direct exposure method); (4) a method which utilizes injection molding; (5) a method of coating a core layer and a cladding layer, and then exposing a core portion to alter refractive index of the core portion (the photo bleaching method); and so forth.

However, the selective polarization method of (1) has problems in sticking the films together, costs are high with the methods of (2) and (3) because a photolithography process is used, and the process of (4) has problems with precision of a core diameter that is obtained. Further, the method of (5) has problems with a sufficient refractive index difference between the core portion and the cladding portion not being provided.

Only the methods of (2) and (3) have excellent characteristics in practice, but have problems with cost as mentioned above. Thus, none of the methods of (1) to (5) can be applied to forming polymer optical waveguides on flexible plastic base materials with large areas.

Now, as a method which is completely different from conventional methods for fabricating polymer optical waveguides as described above, the present inventors have invented and filed applications on a method for fabrication of a polymer optical waveguide which utilizes a mold, which is referred to as a micromolding method. According to this method, it is possible to manufacture polymer optical waveguides extremely simply at low cost. In addition, in spite of the simplicity of the method, it is possible to fabricate polymer optical waveguides with low waveguide losses, and it is possible to easily fabricate waveguides with any form of pattern in which it is possible to fabricate a mold. Furthermore, it is possible to fabricate optical waveguides on flexible plastic base materials, which have been difficult to fabricate heretofore.

Meanwhile, with improvements in processing capabilities of computers in recent years, a problem has arisen with the 'wiring bottleneck', in that electrical wiring between computers and various other devices limits overall capabilities of systems. Accordingly, optical interconnection (optical wiring) has drawn attention as an effective means for overcoming this wiring bottleneck, because there are no signal delays due to impedance as in electrical wiring and inter-wiring interference does not occur.

In optical wiring, an optical transmission/reception module is a key structural component. An optical transmission/reception module propagates light emitted from a light emission element through an optical waveguide, detects light that has been propagated through the optical waveguide with a light reception element, and thus is a module which performs transmission and reception of optical signals.

At a polymer optical waveguide formed with a polymer material, which serves as an optical waveguide to be used with such an optical transmission/reception module, it is possible, by forming optical wires which are matched with light emission/reception elements in an array, to connect optically between the plural light sensors and core portions of the corresponding polymer optical waveguides all at the same time. Further, it is possible to prepare a 45° micromirror surface simply, with a dicing saw or the like, and thus a compact 90° light path change is possible (i.e., an alteration from a wave-guidance direction to a direction which is orthogonal to a film surface). Thus, because it is possible to alter an optical path that connects with a surface-form light emission/reception element, which is surface-mounted, to be parallel with the mounting surface, a low cost light transmission/reception module can be realized.

Further, usement of optical wiring at movable portions, such as hinges of notebook-type computers and folding-type portable telephones, has been considered. A flexible type of polymer optical waveguide which features characteristics of following along with twists and curves, as does a flexible printed base material which is used for electrical wiring, has been investigated. For this flexible-type polymer optical waveguide (flexible optical waveguide), a core in which light is propagated and a cladding which is provided around the core are both fabricated with a material with a low flexural modulus, such as a gel material or the like, and feature flexibility as a whole.

However, in a case in which overall high flexibility is provided in a polymer optical waveguide, deformations are likely to be caused by external forces in pickup, bonding and the like of a mounting process. Consequently, separation between cores when optically connecting at light emission and reception elements is not preserved, positional relationships between cores and alignment marks are not preserved, and mounting with sufficient accuracy is difficult. Furthermore, in a process of preparing a 45° micromirror surface with a dicing saw, because there is flexibility, it is difficult to process a flat surface with high accuracy.

SUMMARY

In consideration of the circumstances described above, the present invention will provide a flexible optical waveguide which, while assuring flexibility, can be mounted with high accuracy and at which machining of a 45° surface or the like at an end portion can be performed with ease, and to provide a flexible optical waveguide which, while assuring flexibility, prevents mispositioning of a core at a connection portion and can be mounted with high accuracy.

A first aspect of the present invention is a flexible optical waveguide including: a core in which light propagates; and a cladding portion with a smaller refractive index than the core, that surrounds the core, wherein the flexible optical waveguide has a flexible portion between both end portions thereof, and at least one end portion of the both end portions is more solid or stiff than the flexible portion.

A second aspect of the present invention is a flexible optical waveguide including: a core in which light propagates; and a cladding portion with a smaller refractive index than the core, which surrounds the core, wherein the cladding portion includes a soft first cladding portion, and a hard second cladding portion, which is provided at at least one end portion, in a direction of propagation of light, of the first cladding portion and which has a higher flexural modulus than the first cladding portion.

In the second aspect of the present invention, the hard second cladding portion, which features a higher flexural modulus than the first cladding portion, is provided at at least one end portion in light propagation direction side of the soft first cladding portion. That is, the cladding portion surrounding the core is structured by two types of cladding portion (soft and hard) with different flexural moduluses. Therefore, in a process of mounting the hard second cladding portion to an object of mounting, there will be no deformation of the cladding portion due to deformation at a time of pickup, pressure at a time of connection or-the like, or the like. Accordingly, it is possible to prevent shifting of an alignment mark provided at the second cladding portion or shifting of a positional relationship between cores which are surrounded by the second cladding portion. Thus, when optical connecting to the object of mounting, such as a light emission element, a light reception element or the like, mounting with high accuracy is possible.

Further, there is no risk of the core surrounded by the second cladding portion deforming when this flexible optical waveguide is abutted against the object of mounting while being mounted. Therefore, it is possible to abut the flexible optical waveguide against the object of mounting to perform positioning, that is, "self-alignment mounting" is possible.

Further, when it is necessary to, for example, perform machining with a dicing saw or the like, if the machining is implemented at the second cladding portion, it is possible to obtain a high-precision machined surface. Thus, it is possible to accurately machine a 45° mirror surface for light path alteration at a distal end portion.

A third aspect of the present invention is a flexible optical waveguide including: a core in which light propagates; a cladding base material with a smaller refractive index than the core, on which the core is disposed; and a cladding portion with a smaller refractive index than the core, which is provided on the cladding base material and encloses a perimeter of the core, wherein the cladding portion includes a first cladding portion, which is structured by a soft cladding material, and a second cladding portion, which is provided at at least one end portion, in a direction of propagation of light, of the first cladding portion and which is structured by a hard cladding material including a higher flexural modulus than the cladding material that structures the first cladding portion.

In this third aspect of the present invention, the cladding portion enclosing the core is disposed on the cladding base material at which the core is disposed, and the cladding portion is structured by the first cladding portion, which is formed of the soft cladding material, and the second cladding material, which is formed of the hard cladding material with the higher flexural modulus than the cladding material that forms the first cladding portion.

Thus, it is possible for the core to be placed on the cladding base material, and for the first cladding portion and second cladding portion to be formed on the cladding base material so as to enclose the core. Thus, a process for fabrication of the flexible optical waveguide will not be complicated.

A fourth aspect of the present invention is a flexible optical waveguide including: a core in which light propagates; a cladding portion with a smaller refractive index than the core, which surrounds the core; and a reinforcing member for reinforcing at least one of the cladding portion and the core, the reinforcing member being embedded in the cladding portion at at least one end portion in a direction of propagation of light.

In the fourth aspect of the present invention, at least one of the cladding portion and the core at least one end portion in light propagation direction, is reinforced by embedding the reinforcing member. Therefore, in a process of mounting the end portion at which the reinforcing member is embedded to an object of mounting, there will be no deformation of the cladding portion and/or the core due to deformation at a time of pickup, pressure at a time of connection or the like, or the like. Accordingly, when optical connecting to the object of mounting, such as a light emission element, a light reception element or the like, mounting with high accuracy is possible. Moreover, because there is no risk of the core deforming and an axial offset occurring, a reduction in connection losses is enabled.

When the present invention is structured as described above, it is possible to mount with high accuracy and to easily perform machining of a 45° surface or the like at an end portion, while assuring flexibility.

Further, when the present invention is structured as described above, it is possible to prevent mispositioning of a core at a connection portion and to mount with high accuracy, while assuring flexibility.

BRIEF DESCRIPTION OF THE DRAWINGS

Embodiments of the invention will be described in detail with reference to the following figures, wherein:

FIG. 1 is a three-way orthographic view showing a polymer optical waveguide film relating to a first embodiment of the present invention.

DETAILED DESCRIPTION

Figure 2A:
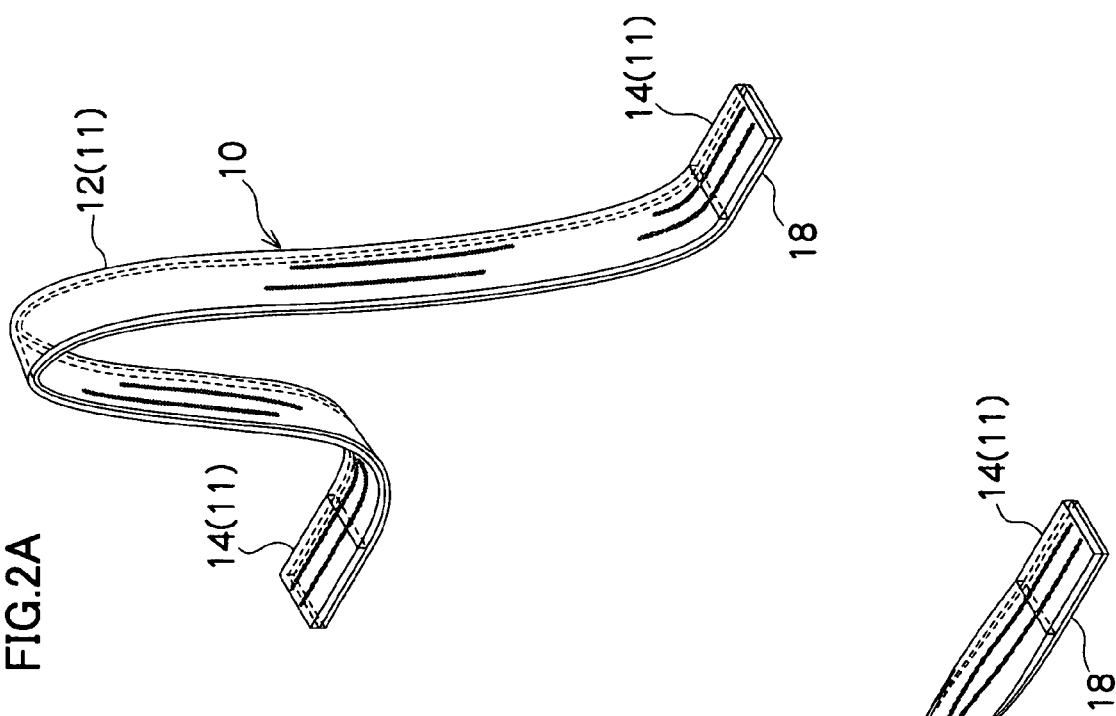
FIGS. 2A and 2B are perspective views showing the polymer optical waveguide film relating to the first embodiment of the present invention.

A polymer optical waveguide film 10 (polymer optical waveguide) relating to a first embodiment of the present invention will be described.

-Polymer Optical Waveguide-

First, structure of the polymer optical waveguide film 10 will be described.

FIG. 1 shows a schematic view of the polymer optical waveguide film 10. As shown in FIG. 1, the polymer optical waveguide film 10 includes a long strip-form cladding film base material 18. Two cores 16 are arranged on the cladding film base material 18 in a row in a width direction of the cladding film base material 18. The cladding film base material 18 is formed of a cladding material with a flexural modulus of 2.9 GPa.

A cladding portion 11 is also provided on the cladding film base material 18, so as to enclose the cores 16. The cladding portion 11 is formed with a soft cladding portion 12 and a hard cladding portion 14, which is provided at each of two light propagation direction ends of the soft cladding portion 12. Here, 70% or more of a cross-sectional area of the polymer optical waveguide film 10 is constituted by the soft cladding portion 12 or the hard cladding portion 14.

Figure 2B:
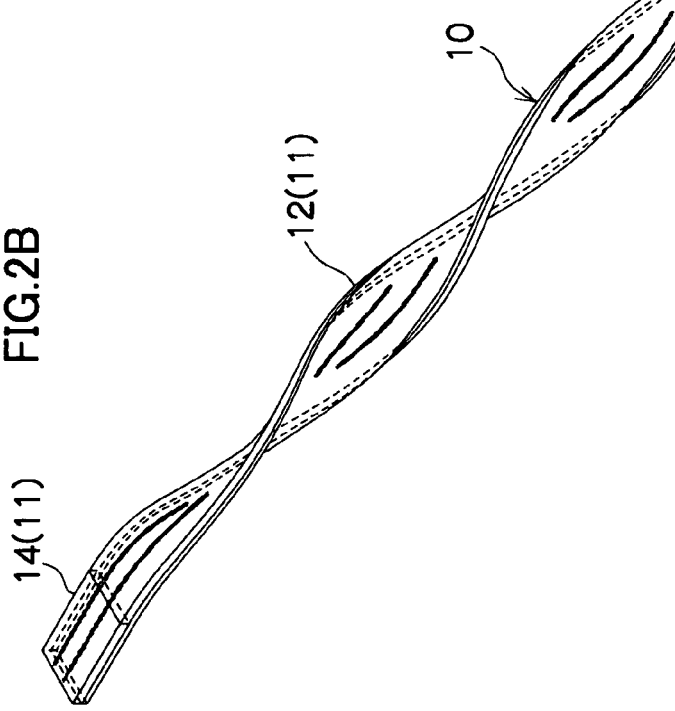

The soft cladding portion 12 is formed of a cladding material with a flexural modulus of 0.3 GPa, and features flexibility to a radius of curvature of 10 mm or less. Therefore, when regions of the soft cladding portion 12 bend as shown in FIG. 2A and/or twist as shown in FIG. 2B, the polymer optical waveguide film 10 can follow along with such deformations. Accordingly, as shown in FIGS. 2A and 2B, even in states in which the polymer optical waveguide film 10 is deformed, light signals which are transmitted from light transmission components (not shown) connected to the polymer optical waveguide film 10 are guided through optical waveguide paths formed in the polymer optical waveguide film 10, and are received at light reception components. Herein, when a very small portion of a curvature that is formed at the inner side of the film when the film is curved is close to circular, the radius of curvature is a value representing the length of the radius of that circle. Acceptable values thereof are measured in accordance with an MIT folding endurance test (ASTM D2176). Further, flexural modulus is measured in accordance with ASTM D790.

The hard cladding portion 14 is formed of a cladding material with a larger flexural modulus than the cladding material that forms the soft cladding portion 12. Here, a flexural modulus of the hard cladding portion 14 is preferably 0.5 GPa or more, and 1.0 GPa or more is more preferable.

Figure 3:
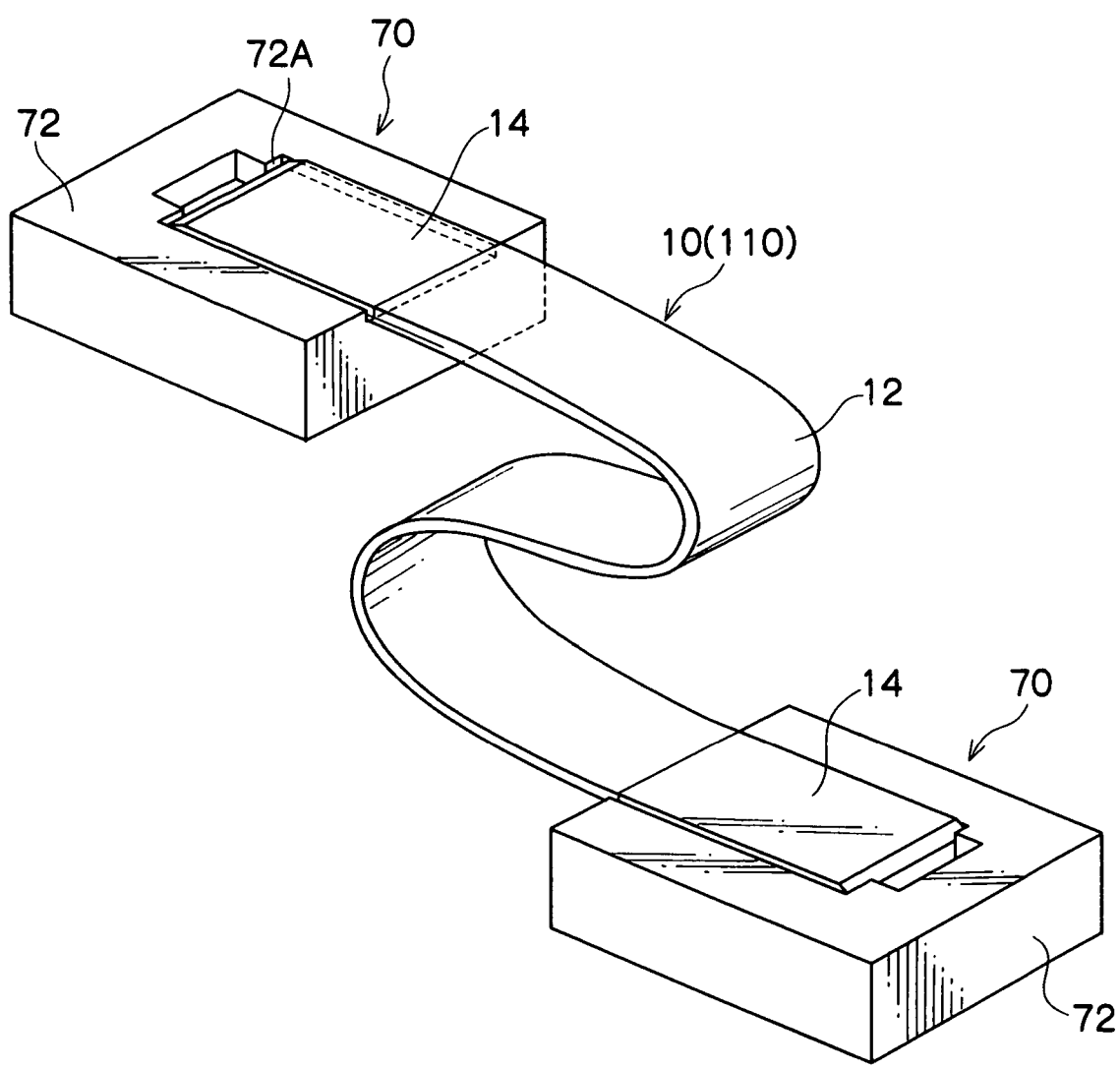
FIG. 3 is a perspective view showing a state in which the polymer optical waveguide film relating to the first embodiment of the present invention is mounted at light transmission/reception components.

Thus, as shown in FIG. 3, when the polymer optical waveguide film 10 is to be mounted at a submount 72 of a light transmission/reception component 70, even when an end portion of the polymer optical waveguide film 10 is picked up and pressed against the submount 72, the end portion of the polymer optical waveguide film 10 will not be deformed. Therefore, mispositioning of an alignment mark formed at the end portion of the polymer optical waveguide film 10 and shifting of a positional relationship between the cores 16 at the end portion can be prevented. Further, it is possible to abut the polymer optical waveguide film 10 against an abutting surface 72A formed at the submount 72 to perform positioning, that is, "self-alignment mounting" is possible.

Figure 4:
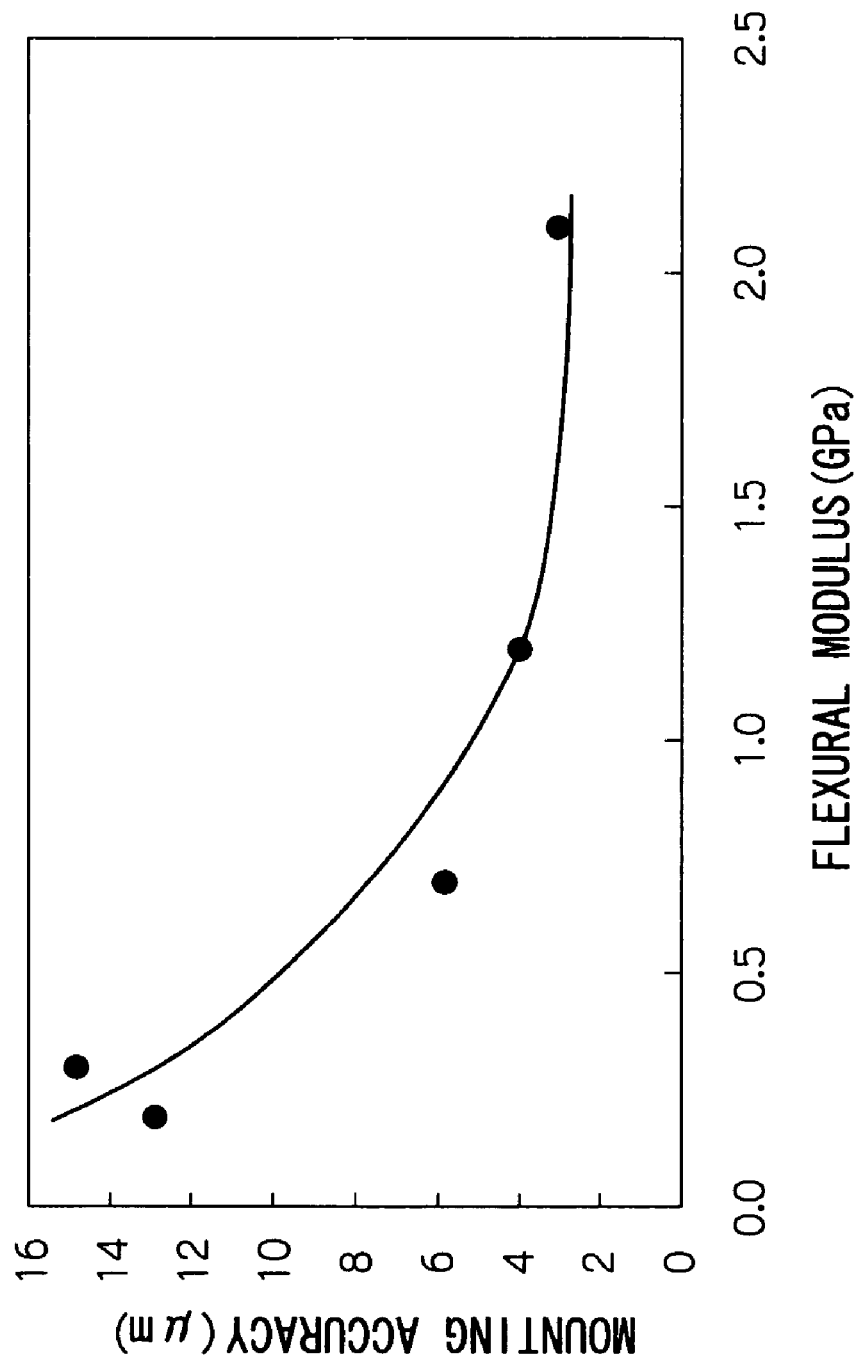
FIG. 4 is a graph showing flexural modulus and mounting accuracy of the polymer optical waveguide film relating to the first embodiment of the present invention.

FIG. 4 shows, in a graph, results of measurement of positional offsets between cores and light elements provided at an object of mounting, when test pieces (with length 3 mm, width 3 mm and thickness 0.5 mm) with different flexural moduluses are mounted on a silicon substrate using a high-precision die-bonder (which has a mounting accuracy of ±1 μm when unloaded).

Now, when a core of a multimode optical wave-guide with a diameter of around 50 μm is connected with an optical element, a mounting accuracy of around ±10 μm is necessary. Therefore, it can be seen from FIG. 4 that to satisfy a condition of a mounting accuracy of ±10 m, it is necessary for the flexural modulus of the hard cladding portion 14 of the polymer optical waveguide film 10 to be at least 0.5 GPa. That is, as a flexural modulus of the hard cladding portion 14 for achieving a mounting accuracy of ±10 m, 0.5 GPa or more is preferable and, when stability of mounting accuracy is considered, 1.0 GPa or more is more preferable.

Herein, a resin material to be used at the polymer optical waveguide film 10 will be described later.

Now, if a thickness of the polymer optical waveguide film 10 is smaller than 50 μm, it will not be possible to provide the hard cladding portion 14 with sufficient strength, and if the thickness is greater than 500 μm, flexibility of the soft cladding portion 12 will not be provided. Accordingly, the thickness of the polymer optical waveguide film 10 is set to between 50 μm and 500 μm. Thus, it is possible to assure flexibility of the soft cladding portion 12 and provide adequate strength to the hard cladding portion 14. Further, a width of the polymer optical waveguide film 10 is set in a range of 0.5 mm to 10 mm. Thus, the ability of the polymer optical waveguide film 10 to follow along with deformations is raised. Here, it is preferable if the thickness of the polymer optical waveguide film 10 is set in a range of 100 μm to 200 μm and the width is set in a range of 1 mm to 5 mm.

Figure 9:
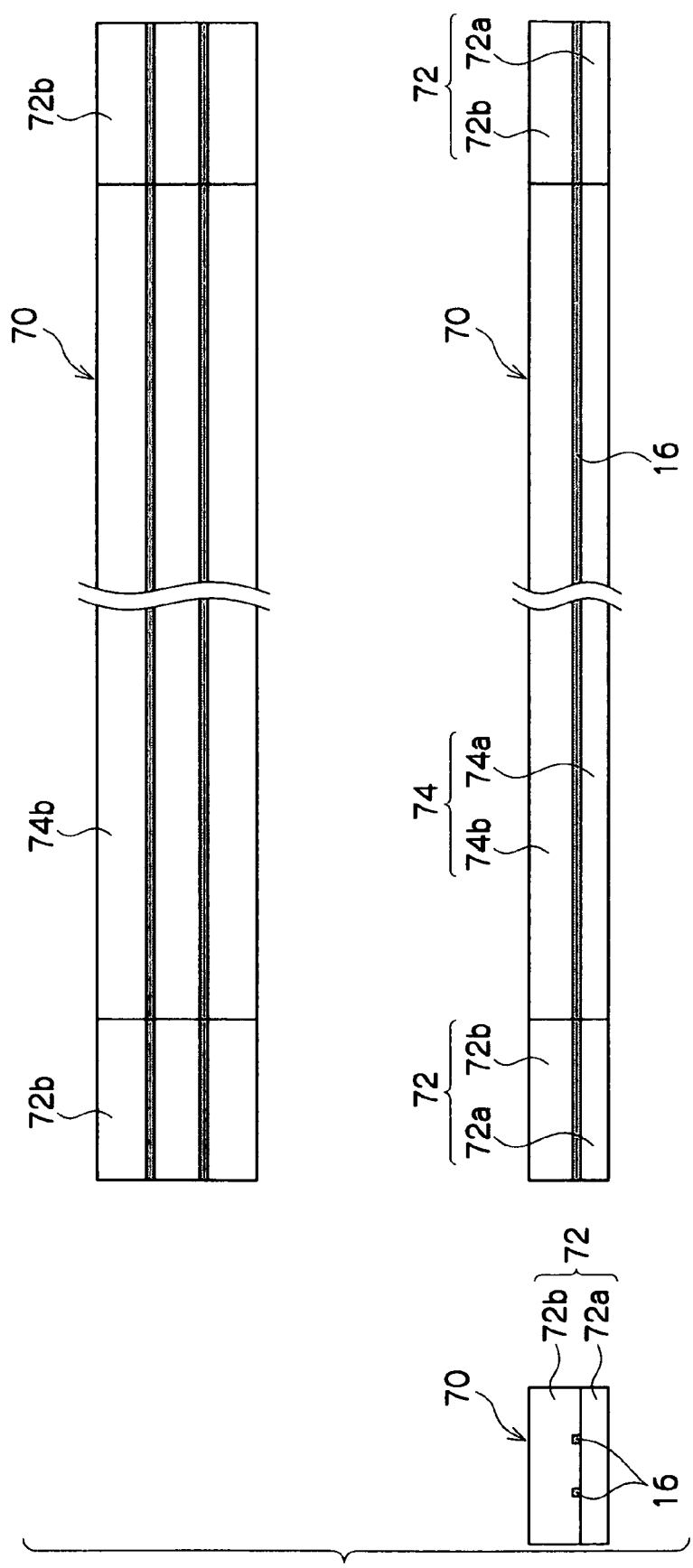
FIG. 9 is a three-way orthographic view showing a polymer optical waveguide film of a variant example of the first embodiment of the present invention.

The present embodiment, as shown in FIG. 1, has a structure in which the soft cladding portion 12 and the hard cladding portion 14, which have different flexural moduluses from the cladding material that structures the cladding film base material 18, are provided on the cladding film base material 18. However, as shown in FIG. 9, a structure is also possible in which a hard cladding portion 72 which is structured by a hard cladding material is provided at two ends of a soft cladding portion 74 which is structured by a soft cladding material. That is, a hard cladding portion 72a is provided at two ends in a light propagation direction of a soft cladding portion 74a. The soft cladding portion 74a is structured by a soft cladding material, and the hard cladding portion 72a is structured by a cladding material with a higher flexural modulus than the cladding material that structures the soft cladding portion 74. The cores 16 are disposed on the soft cladding portion 74a and the hard cladding portion 72a. A soft cladding portion 74b is provided on the soft cladding portion 74a so as to enclose the cores 16. The soft cladding portion 74b is structured by a cladding material with a flexural modulus which is the same as that of the cladding material that structures the soft cladding portion 74a. A hard cladding portion 72b is provided on the hard cladding portion 72a. The hard cladding portion 72b is structured by a cladding material with a flexural modulus the same as that of the cladding material that structures the hard cladding portion 72a. Thus, a polymer optical waveguide film 70 is structured.

Next, a process for fabrication of the polymer optical waveguide film 10 (flexible optical waveguide) of the present invention will be described in a sequence of steps, using FIGS. 5A to 5J.

1) A step of preparing a mold which is formed from a cured resin layer of a curable resin for mold formation, which includes recess portions to correspond to core protrusion portions and which includes through-holes respectively communicating with one ends and other ends of the recess portions It is preferable to perform fabrication of the mold using a master (a master plate) at which protrusion portions are formed which correspond to optical waveguide cores (below referred to as 'cores'). However, the fabrication is not limited thus. Herebelow, a method which uses a master will be described.

-Master Fabrication-

For fabrication of a master 20 at which protrusion portions 22 are formed to correspond to cores (illustrated in FIG. 5A), it is possible to use a conventional method without particular limitation, such as, for example, a photolithography process, an RIE process or the like. It is also possible to apply a process for fabricating an optical waveguide by an electrodeposition method or photoelectrodeposition method, for which an application has been previously submitted by the present applicant (Japanese Patent Application Laid-Open (JP-A) No. 2002-333538), to fabrication of the master 20.

The size of each protrusion portion 22 which is formed at the master 20 to correspond to the core 16 is generally of the order of around 5 to 500 μm (side), is preferably of the order of around 40 to 200 μm (side), and is suitably determined in accordance with a field of application of the polymer optical waveguide film 10 and the like. For example, in cases of polymer optical waveguide films for single-mode use, cores of the order of around 10 μm (side), and in cases of polymer optical waveguide films for multimode use, cores of the order of around 50 to 100 μm (side) are generally used. However, depending on applications, polymer optical waveguide films with even larger cores, of the order of hundreds of microns (side), can be used.

-Mold Fabrication-

Next, a step of fabrication of a mold 30 will be described.

Figure 5:
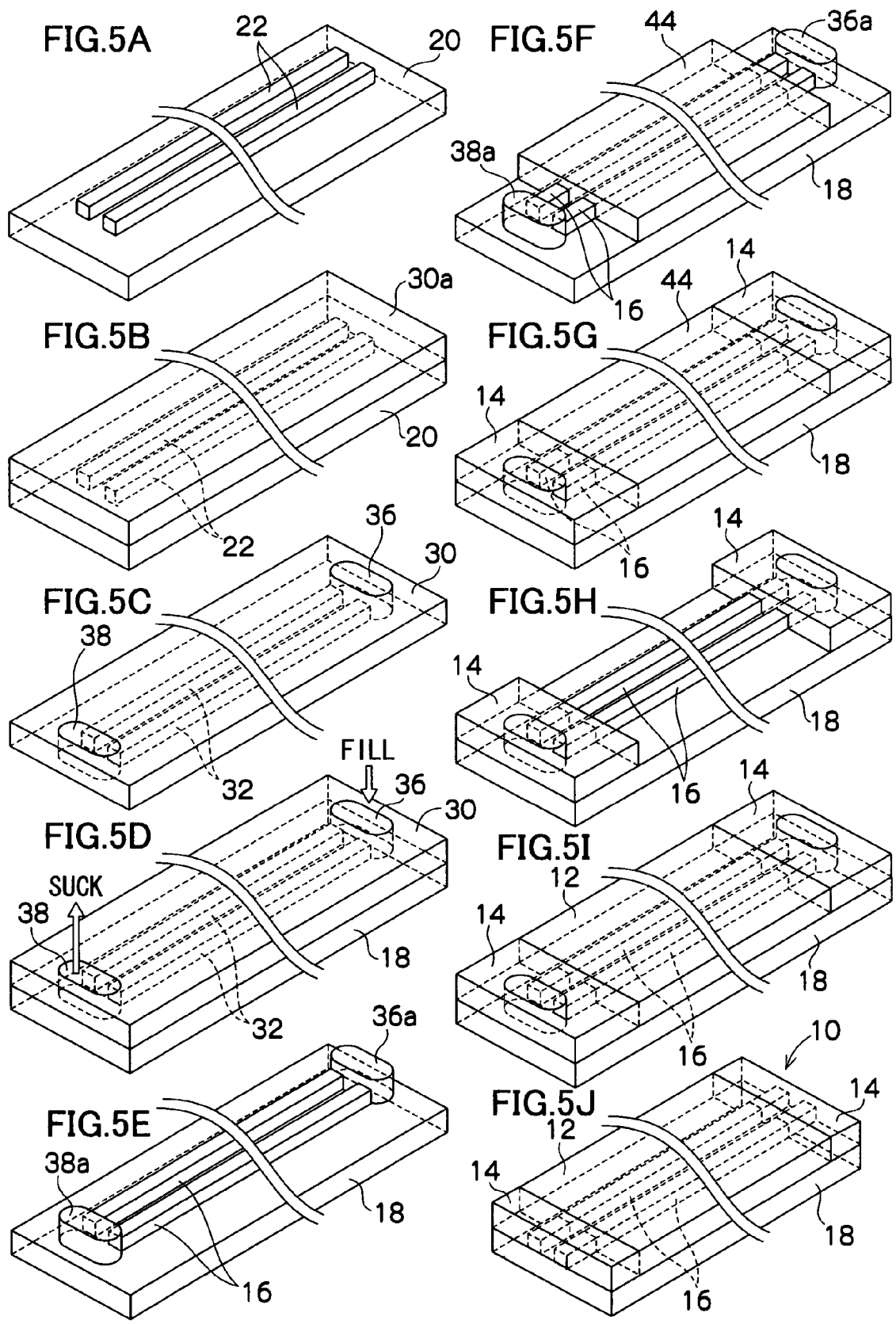
FIGS. 5A, 5B, 5C, 5D, 5E, 5F, 5G, 5H, 5I and 5J are perspective views showing a process for fabrication of the polymer optical waveguide film relating to the first embodiment of the present invention.

At a face of the master 20, which has been fabricated as described above, at which face the protrusion portions 22 corresponding to the cores 16 are formed, a curable resin for mold formation is coated or poured on to form a curable resin layer 30a, as shown in FIG. 5B. Drying processing is applied as necessary, and the curable resin layer 30a is cured. Then, the cured curable resin layer 30a is removed from the master 20. Thus the mold 30 is fabricated, at which recess portions 32 corresponding to the protrusion portions 22 are formed.

Next, as shown in FIG. 5C, an inflow aperture 36 and an outflow aperture 38 are formed by punching. The inflow aperture 36 is for filling a curable resin for core formation into the recess portions 32, and the outflow aperture 38 is for outflow of the resin from the recess portions 32. When the outflow aperture 38 has been formed by punching in this manner, the mold 30 may be closely contacted with the cladding film base material 18, which is described later. Accordingly, cavities other than the recess portions 32 will not be formed between the mold 30 and the cladding film base material 18. Thus, there is no risk of the curable resin for core formation leaking to regions other than the recess portions 32.

Note that various methods can be used other than a structure in which the inflow aperture 36 and the outflow aperture 38 are provided beforehand by punching of the mold 30. Such other methods include, for example, a method of forming a cured resin layer of the curable resin for mold formation at the master, then separating the cured resin layer from the master to produce the mold, and thereafter forming the inflow aperture and the outflow aperture by cutting so as to expose the recess portions at the two ends of the mold. A method for formation of the inflow aperture 36 and the outflow aperture 38 is not particularly limited to the above.

Consequent to the inflow aperture 36 and outflow aperture 38 communicating with the recess portions 32 of the mold 30 being provided at the two ends of the recess portions 32, the inflow aperture 36 can be utilized as a liquid (resin) reservoir, and a decompression suction tube can be inserted into the outflow aperture 38 to connect the interiors of the recess portions 32 with a decompression suction device. It is also possible to connect an inflow tube to the inflow aperture 36 and pressure-flow resin into the recess portion 32 through the inflow aperture 36. Shape, size and the like of the inflow aperture 36 are not particularly limited as long as the inflow aperture 36 communicates with the recess portions 32 and has functionality as a liquid reservoir. Shape, size and the like of the outflow aperture 38 are also not particularly limited as long as the outflow aperture 38 communicates with the recess portions 32 and can be used for decompression pressure suction.

Because the inflow aperture 36 has the functionality of a liquid reservoir, cross-sectional area of the inflow aperture 36 is set such that, when the mold 30 is closely contacted with the later-described cladding film base material 18, the cross-sectional area of the inflow aperture 36 is large at the side of contact with the cladding film base material 18 and is progressively smaller away from the cladding film base material 18. In other words, the inflow aperture 36 is formed as a truncated taper. Therefore, after the curable resin for core formation has been filled through the inflow aperture 36 into the recess portions 32 and cured, it is easy to remove the curable resin for core formation from the mold 30.

A thickness of the cured resin layer for core formation is suitably determined in consideration of handling characteristics of the mold 30, but ordinarily around 0.1 to 50 mm will be suitable. If a mold-separation process, such as application of a separation agent or the like, is applied to the master 20 in advance, it will be easier to remove the curable resin for core formation from the master 20, and separation of the master 20 and the mold 30 is facilitated.

It is preferable if the curable resin for mold formation is a resin which is capable of easily separating from the master 20 after curing, has mechanical strength and dimensional stability of at least a certain level to serve (i.e., to be repeatedly used) as the mold 30, has hardness (stiffness) that will sustain shapes of the recess portions 32, and has excellent characteristics for closely contacting with the later-described cladding film base material 18. It is possible to add various additives to the curable resin for mold formation in accordance with requirements.

The curable resin for mold formation must be capable of coating, casting or the like at surfaces of the master 20, and of accurately transferring the protrusion portions 22 which have been formed at the master 20 to correspond to the individual cores 16. Accordingly, a resin with a viscosity of no more than a certain limit, for example, 500 to 7000 mPa·s is desirable. (The term 'curable resin for mold formation' used for the present invention includes resins which would form a rubber body having resilience after curing.) It is also possible to add a solvent for viscosity adjustment to the curable resin for mold formation, in an amount such that an adverse effect of the solvent will not be expressed.

With regard to separability, mechanical strength, dimensional stability, stiffness, and close adherence to the cladding film base material, it is preferable to use a curable organopolysiloxane that will form a silicon rubber (silicon elastomer) or silicon resin after curing as the curable resin for mold formation. The curable organopolysiloxane preferably includes a methyl siloxane group, an ethyl siloxane group and a phenyl siloxane group in the molecule. Further, the curable organopolysiloxane may be a single-component type resin, or a two-component type resin in which a combination with a curing agent is used. Further yet, the curable organopolysiloxane may be a heat-curing type resin or a room temperature-curing type resin (for example, a resin which is cured by moisture in air), and may further be a resin which utilizes another kind of curing (ultraviolet radiation curing or the like).

As the curable organopolysiloxane, a resin that will form a silicon rubber after curing is preferable. Among resins that form silicon rubbers after curing, ordinary resins referred to as liquid silicon rubbers (in which the term 'liquid' includes high viscosity substances such as pastes) may be utilized. A liquid silicon rubber is preferably a two-component type resin which uses a combination with a curing agent. Of these, additive-type liquid silicon rubbers are preferably used, which cure promptly and consistently between surfaces and interior portions, with few or no by-products at the time of curing, and which have excellent separability and small contraction ratios.

Of liquid silicon rubbers, a liquid dimethylsiloxane rubber is particularly preferable in regard to close-contact characteristics, separation characteristics, and characteristics of control of strength and stiffness. Furthermore, because the cured form of a liquid dimethylsiloxane rubber generally has a low refractive index, of around 1.43, a mold which is formed using such a material can be used as the cladding portion 11 as is, not being separated from the cladding film base material 18. In such a case, processing such that the curable resin for core formation that is flowed in and the cladding film base material 18 will not separate from the mold 30 will be required.

In regard to accurately transferring the protrusion portions 22 which correspond to the cores 16, reducing mixing of air and facilitating degassing, and with regard to forming a mold with a thickness of a few millimeters, viscosity of the liquid silicon rubber is preferably around 500 to 7000 mPa·s, and is more preferably around 2000 to 5000 mPa·s.

Furthermore, a surface energy of the mold 30 in a range of 10 dyn/cm to 30 dyn/cm, and more particularly 15 dyn/cm to 24 dyn/cm, is preferable in consideration of close-contactability with the cladding film base material 18 and a rate of permeation of the curable resin for core formation.

A Shore rubber hardness of the mold 30 may be from 15 to 80, and is more particularly preferably from 20 to 60, in consideration of mold-removal characteristics, maintenance of recess portion forms, and separability. Here, the Shore rubber hardness can be measured using a durometer in accordance with JIS K 6253.

Surface roughness of the mold 30 (arithmetic mean roughness Ra) is preferably, in consideration of mold-removal characteristics, not more than 0.2 μm, and more preferably not more than 0.1 μm. Here, the arithmetic mean roughness Ra can be measured in accordance with JIS B 0601.

It is also preferable if the mold 30 is transmissive of light in the ultraviolet region and/or the visible region. When the mold 30 is transmissive of light in the visible region, positioning is easily implemented when the mold 30 is closely contacted with the cladding film base material 18 (see FIG. 5D) in a below-described step 2). Moreover, in a later-described step 3), a state of filling of the curable resin for core formation into the recess portions 32 of the mold 30 can be visually inspected, and it is possible to confirm when filling is complete with ease.

Furthermore, it is preferable if the mold 30 is transmissive of light in the ultraviolet region, so that ultraviolet curing can be performed through the mold 30 in a case in which an ultraviolet radiation-curable resin is used as the curable resin for core formation. Accordingly, it is preferable if transmissivity of the mold 30 in an ultraviolet region (250 nm to 400 nm) is at least 80%.

Of curable organopolysiloxanes, a liquid silicon rubber that forms a silicon rubber after curing has excellent collide-characteristics, meaning ability to closely contact with the cladding film base material 18 and separability therefrom, has functionality for transferring nanostructures, and can prevent ingression of fluid when the silicon rubber and the cladding film base material 18 are closely contacted. The mold 30 which uses such a silicon rubber accurately transfers the shape of the master 20 and fits tightly with the cladding film base material 18. Consequently, the curable resin for core formation can be efficiently filled into just the recess portions 32 between the mold 30 and the cladding film base material 18. Furthermore, separation of the cladding film base material 18 and the mold 30 is easy. Accordingly, it is possible to extremely easily fabricate the polymer optical waveguide film 10 form of which is maintained highly accurately from the mold 30.

Regarding the cured resin layer, particularly when the cured resin layer features rubber resilience, a portion of the cured resin layer, which is a region other than a region for transferring the protrusion portions 22 of the master 20, can be replaced with another, stiffer material. In such a case, handling characteristics of the mold 30 are improved.

Anyway, as another example of fabrication of the mold, there is a method in which, in addition to the protrusion portions corresponding to the cores, protrusion portions for formation of through-holes (the inflow aperture and the outflow aperture) are provided at the master, a curable resin for mold formation is applied to the master such that the protrusion portions for forming the through-holes pierce therethrough, this curable resin for mold formation is cured, and then the cured resin layer is separated from the master. In such a case, heights of the protrusion portions must be higher than a thickness of the curable resin for mold formation.

2) A step of closely contacting the cladding film base material 18 with the mold 30

The cladding film base material 18 is closely fitted with the mold 30. Here, because the polymer optical waveguide film is to be used for optical wiring of various tiers, a material to serve as the cladding film base material 18 is selected in consideration of refractive index, optical characteristics such as transmissivity and the like, mechanical strength, heat resistance, close-contactability with the mold, flexibility, and so forth.

Accordingly, the material to be used as the cladding film base material 18 may be an alicyclic acrylic resin film, an alicyclic olefin resin film, a cellulose triacetate film, a fluoride-containing resin film or the like.

Further, as the cladding film base material 18, it is preferable to use a material with excellent characteristics of close contact with the mold 30, which, when the two are closely contacted, will not produce cavities other than the recess portions 32 of the mold 30.

As an alicyclic acrylic resin film, an aliphatic cyclic hydrocarbon such as tricyclodecane or the like, into which an ester substituent has been introduced, OZ-1000 and OZ-1100 are available; and as an alicyclic olefin resin film, materials including a norbornene structure in the main chain, and materials including a norbornene structure in the main chain and a polar group such as an alkyloxycarbonyl group (an alkyl group which has 1 to 6 carbon atoms (numbers) or a cycloalkyl group or the like) or the like in a side chain are available. Of these, an alicyclic olefin resin having, as described above, a norbornene structure in the main chain and a polar group such as an alkyloxycarbonyl group or the like in a side chain has excellent optical characteristics, such as a low refractive index (a refractive index in the vicinity of 1.50, so a difference between the refractive indices of the core 16 and the cladding film base material 18 can be assured), a high transmissivity and the like. Such a material has excellent characteristics of close contact with the mold 30 and excellent heat resistance, and so is particularly suitable for fabrication of the polymer optical waveguide film 10 of the present invention.

In order to assure a refractive index difference from the cores 16, it is desirable if the refractive index of the cladding film base material 18 is smaller than 1.55, and more preferably smaller than 1.53.

A thickness of the cladding film base material 18 is suitably selected in consideration of flexibility and stiffness, ease of handling and the like, and is generally preferably around 0.05 to 0.5 mm.

3) A step of filling the curable resin for core formation into the recess portions 32 of the mold 30 with which the cladding film base material 18 has been closely contacted As shown in FIG. 5D, the curable resin for core formation flows into the inflow aperture 36 formed at one end of the recess portions 32, is sucked by decompression from the outflow aperture 38 formed at the other end of the recess portions 32, and thus the curable resin for core formation is filled into the recess portions 32. Because of this decompression suction, close contact characteristics between the mold 30 and the cladding film base material 18 are improved, and it is possible to avoid mixing in of air bubbles. The decompression suction is performed by, for example, inserting a suction pipe into the outflow aperture 38 and connecting the suction pipe to a pump.

Note that a method for filling the curable resin for core formation into the recess portions 32 is not limited to the method described above. For example, there are methods for filling the curable resin for core formation into the recess portions 32 by: dropping small amounts of the curable resin for core formation into the inflow aperture 36 and utilizing the capillary effect for filling; pressure-filling the curable resin for core formation into the recess portions 32 from the inflow aperture 36; decompression sucking into the recess portions 32 from the outflow aperture 38; and performing both pressure-filling and decompression suction. When pressure-filling and decompression suction are combined, it is desirable to perform both simultaneously. Accordingly, in a state in which the mold 30 is stably fixed, pressure of the pressure-filling is increased stepwise, and pressure of the decompression suction is reduced stepwise. Thus, reciprocity is achieved to flow the curable resin for core formation in rapidly. Further, if the capillary effect is utilized to fill the curable resin for core formation into the recess portions 32, it is preferable if a pressure in the recess portions 32 is reduced around 0.1 to 100 kPa in the recess portions 32, in order to facilitate the filling. Further yet, an effective means for promoting filling is to lower viscosity of the curable resin for core formation by heating the curable resin for core formation that is being filled through the inflow aperture 36 of the mold 30 in addition to decompression in the recess portions 32.

As the curable resin for core formation, it is possible to use a resin with ultraviolet-curability, radiation-curability, electron beam-curability, heat-curability or the like. Of these, ultraviolet-curable resins and heat-curable resins are preferably used. As an ultraviolet-curable resin or heat-curable resin for core formation, an ultraviolet-curable or heat-curable monomer, oligomer or monomer-oligomer mixture is preferably used. Further, as an ultraviolet-curable resin, an epoxy resin, polyimide resin or acryl-based ultraviolet-curable resin is preferably used. Hence, because the cores are formed with a polymer compound instead of being formed with a silicon base material, a glass base material or the like, it is possible to keep material costs lower, which leads to a reduction in production costs. Further yet, when the cores are formed with a polymer compound such as an ultraviolet-curable, radiation-curable, electron beam-curable, heat-curable, etc. resin or the like, it is simple to provide arbitrary shapes.

For filling of the curable resin for core formation into the cavities formed between the mold 30 and the cladding film base material 18 (i.e., the recess portions 32), it is required that the curable resin for core formation has a low viscosity. When viscosity of the curable resin for core formation is 10 to 2000 mPa·s, preferably 20 to 1000 mPa·s and even more preferably 30 to 500 mPa·s, a filling speed becomes rapid, the cores 16 can be provided with precise shapes, and light losses can be reduced.

Additionally, for accurate reproduction of the original shapes of the protrusion portions 22 that have been formed at the master 20 to correspond to the cores 16, it is required that a volume change after curing of the curable resin is small. For example, if the volume shrinks, waveguide losses will result. Therefore, it is desirable that the curable resin has as small a volume change as possible, and a resin with a volume change of 10% or less is used. Preferably, a resin with a volume change of 6% or less is used. It is preferable, if possible, to avoid using a solvent to lower viscosity of the curable resin, because a volume change after curing will be larger. On the other hand, with a material with a volume shrinkage of 0.01% or less or a material whose volume expands, an efficiency of separation from the mold 30 is lowered, and surface degradation such as fractures in the surface and the like will occur at a time of separation from the mold 30. Consequently, flatness of surfaces of the core 16 will be lowered and optical wave-guide losses will be increased, which is not preferable.

In order to reduce a volume change (shrinkage) after curing of the curable resin for core formation, it is possible to add a polymer to the resin. The polymer preferably has compatibility with the curable resin for core formation, and does not adversely affect refractive index, elastic modulus and transmission characteristics of the resin. Beside reducing the volume change by addition of the polymer, it is also possible to precisely control viscosity, glass transition temperature and the like of the curable resin. A polymer that is used is, for example, an acryl-based, methacrylate-acid based or epoxy-based polymer, but is not limited to these.

The refractive index of the cured form of the curable resin for core formation must be larger than that of the film material which constitutes the film base material (including the cladding portion 11 of the later-described step 5)), and is not less than 1.50, and preferably not less than 1.53. The refractive index difference between the cores and the clad (which is the cladding film base material 18 and the cladding portion 11) is not less than 0.01, preferably not less than 0.03.

4) A step of curing the filled curable resin for core formation and separating the mold 30 from the cladding film base material 18

The curable resin for core formation which has been filled into the recess portions 32 in the above step 3) is cured. An ultraviolet lamp, ultraviolet LEDs, a UV illumination device or the like is used for curing an ultraviolet-curable resin, and heating in an oven or the like is used for curing a heat-curable resin.

Thereafter, the mold 30 is separated from the cladding film base material 18. As shown in FIG. 5E, the cores 16 and resin portions 36a and 38a, which have been cured in the inflow aperture 36 and the outflow aperture 38, are formed on the cladding film base material 18 which has been separated.

Further, the mold 30 used in the above-described steps 1) to 3) can be used at the cladding portion (the hard cladding portions 14) as is, provided the mold 30 satisfies conditions such as refractive index and the like. In such a case, the mold is utilized as the cladding portion as it is, separation being not necessary. In such a case, it is preferable to perform ozone processing on the mold, in order to improve adherence between the mold and the core material.

5) A step of forming the cladding portion 11 constituted by the hard cladding portions 14 and the soft cladding portion 12 on the cladding film base material 18 at which the cores 16 have been formed As shown in FIG. 5I, the cladding portion 11, which is constituted by the hard cladding portions 14 and the soft cladding portion 12, is formed on the cladding film base material 18 at which the cores 16 have been formed. The cladding portion 11 may be a layer in which a curable resin for cladding is applied and cured, a polymer film which is obtained by applying and drying a solvent solution of a polymer material, or the like. As the curable resin for cladding, an ultraviolet-curable resin, a heat-curable resin or the like is preferably used. For example, an ultraviolet-curable or heat-curable monomer, oligomer or monomer-oligomer mixture can be used.

Further, in order to reduce a volume change (shrinkage) of the curable resin for cladding formation after curing, it is possible to add a polymer, which has compatibility with the resin and does not adversely affect refractive index, flexural modulus or transmission characteristics of the resin (for example, a methacrylate-acid based or epoxy-based polymer), to the curable resin for cladding formation (an ultraviolet radiation-curable resin or heat-curable resin).

The hard cladding portions 14 and the soft cladding portion 12 are respectively formed by applying a cladding material and curing. Two kinds of cladding material may be simultaneously applied onto the cladding film base material 18 at which the cores 16 have been formed, and cured. Alternatively, each kind may be applied and cured in turn.

A case of forming the hard cladding portion 14 and the soft cladding portion 12 one after the other is carried out, for example, as shown in FIGS. 5F to 5I. First, as shown in FIG. 5F, a protective mask 44 is disposed at a region where the soft cladding portion 12 is formed. The protective mask 44 is not particularly specified as long as, when the protective mask 44 is closely contacted with the cladding film base material 18 at which the cores 16 are formed and the protective mask 44 does not cause damage to the cores 16 when contacting with the formed cores 16. For example, the silicon rubber that is used as the curable resin for mold formation may be used. Herein, damage to the cores 16 means an increase in optical wave-guide losses, due to flaws, roughness or the like at side faces of the core 16, of 0.2 dB or more.

Next, as shown in FIG. 5G, an ultraviolet-curable resin for the hard cladding portions 14 is applied, and is ultraviolet-cured by irradiation with ultraviolet rays. Thus, the hard cladding portions 14 are formed. Then, as shown in FIG. 5H, the protective mask 44 is removed, an ultraviolet-curable resin for the soft cladding portion 12 is applied to the region at which the protective mask 44 was disposed, and is irradiated with ultraviolet radiation to be ultraviolet-cured. Thus, as shown in FIG. 5I, the soft cladding portion 12 is formed at the region at which the protective mask 44 was disposed. Then, as shown in FIG. 5J, the resin portions 36a and 38a, which were cured in the inflow aperture 36 and the outflow aperture 38, are removed by grinding or the like.

It is desirable that a refractive index of the cladding portion 11 (the hard cladding portions 14 and the soft cladding portion 12) is not more than 1.55, preferably not more than 1.53, in order to assure a refractive index difference from the cores 16. It is also preferable, in regard to light confinement, if the refractive indexes of the hard cladding portions 14 and the soft cladding portion 12 are equal to the refractive index of the cladding film base material 18.

This method for formation of the polymer optical waveguide film 10 is based on the fact that when a cladding film base material 18 which has excellent close-contactability with the mold 30 is closely contacted with the mold 30, it is possible for the curable resin for core formation to proceed into only the recess portions 32 without cavities being formed between the mold 30 and the cladding film base material 18, even without the mold 30 being fixed to the cladding film base material 18 by any particular means, other than the structures of the recess portions 32 formed at the mold 30. Consequently, fabrication steps are greatly simplified, and it is possible to fabricate the polymer optical waveguide film 10 with ease. Accordingly, in comparison with a conventional method of fabrication of a polymer optical waveguide film, it is possible to fabricate the polymer optical waveguide film 10 with very low costs.

Furthermore, with this fabrication method, it is possible to form through-holes (the inflow aperture 36 and the outflow aperture 38) in the mold 30, to fill the curable resin for core formation in through the inflow aperture 36 to the recess portions 32, and to suck the curable resin for core formation from the outflow aperture 38 with decompression. Thus, it is possible to further improve close-contact characteristics between the mold 30 and the cladding film base material 18, and to avoid mixing of air bubbles. Further yet, with this simple method, the polymer optical waveguide film 10 that is obtained has high accuracy and small waveguide losses, and can be arbitrarily equipped to various kinds of apparatus.

Below, the first embodiment will be concretely described by Examples 1 to 3. Note that the present invention is not limited by these Examples 1 to 3.

EXAMPLE 1

-Fabrication of Master-

A thick film resist (SU-8, produced by MicroChem Corporation) is applied to a silicon base material by a spin-coating process, then pre-baked at 80° C., exposed through a photomask, and developed. In this manner, two protrusion portions for cores with square cross-sections (width 50 μm, height 50 μm, length 80 mm) are formed. Here, a distance between the two protrusion portions is set to 250 μm. This sample is post-baked at 120° C., to produce a master for core fabrication.

-Fabrication of Mold-

Next, a release agent is applied to the master, and then a mixture of a heat-curable liquid-form dimethyl siloxane rubber (SYLGARD 184, produced by Dow Corning Asia Corporation, with viscosity 5000 mPa·s) and a curing agent therefor is flowed in to serve as a mold material. This is heated at 120° C. for 30 minutes to be cured. Then the mold material is separated from the master, to produce a mold (thickness 5 mm) in which recess portions for cores are formed (i.e., recess portions corresponding to the protrusion portions for cores). Next, an inflow aperture for filling of an ultraviolet-curable resin and an outflow aperture for outflow of the resin (the ultraviolet-curable resin), which have circular shapes in plan view and whose cross-sectional shapes have tapered forms, are formed by punching, so as to communicate with the recess portions at the ends of the recess portions.

-Fabrication of Cladding Film Base Material and Cores-

A cladding film base material, which is a size larger than the mold with a thickness of 100 μm (ARTON FILM, produced by JSR Corporation, with flexural modulus 2.9 GPa and refractive index 1.510), is closely contacted with the mold.

Next, a number of droplets of an ultraviolet-curable resin with viscosity 500 mPa·s are dropped into the inflow aperture at one end of the mold, and decompression suction is performed from the outlet aperture. Thus, the ultraviolet-curable resin is filled into the recess portions over 10 minutes. Then, UV light at 50 mW/cm$^2$ is irradiated from above the mold for 5 minutes, the ultraviolet-curable resin is cured, and the mold is separated from the cladding film base material.

Thus, cores with shapes the same as the protrusion portions of the master are formed on the cladding film base material.

-Fabrication of Hard Cladding Portion and Soft Cladding Portion-

Next, a protective mask fabricated of the same material as the mold is closely contacted with the surface of the cladding film base material at which the cores have been formed. An ultraviolet-curable resin for the hard cladding portions, of which the refractive index after curing is 1.510, the same as a cladding film base material, and the flexural modulus is 2.1 GPa, is applied to exposed regions of the face at which the cores are formed (i.e., two wave-guidance direction ends of the optical waveguide). Hence, ultraviolet curing is performed by irradiation with UV light at 50 mW/cm$^2$ for 5 minutes.

Then, the protective mask is removed, and an ultraviolet-curable resin for the soft cladding portion, of which the refractive index after curing is 1.510, the same as the cladding film base material, and the flexural modulus is 0.3 GPa, is applied to an exposed region of the face at which the cores have been formed. Hence, ultraviolet curing is performed by irradiation with UV light at 50 mW/cm$^2$ for 5 minutes.

Thereafter, using a dicing saw, a belt-form polymer optical waveguide film which is formed to a length of 70 mm, a width of 1.5 mm and a thickness of 300 μm, with hard cladding portions at the two length direction ends thereof, is produced.

Now, a silicon substrate is prepared with length 5 mm and width 5 mm, at which a '+'-form alignment mark with a width of 5 μm is formed, and a verification of mounting accuracy of the fabricated polymer optical waveguide film is carried out. Using a die-bonder which has a mounting accuracy of ±1 μm in an unloaded state, the polymer optical waveguide film is mounted on the silicon substrate with passive alignment by image verification. With a bonding load of 6 N, an ultraviolet-curable resin that has been applied beforehand is cured by ultraviolet radiation, and the polymer optical waveguide film is adhered onto the silicon substrate.

When the above-described mounting accuracy verification is carried out ten times, offsets from ideal mounting positions of the cores are within 5 μm. Furthermore, positions of the cores at end portions of joining faces of the polymer optical waveguide film and separations between the cores do not noticeably change between before and after the mounting.

EXAMPLE 2

First, a polymer optical waveguide film is prepared in the same manner as in Example 1.

Then, using a dicing saw equipped with a blade for silicon which is angled at 45°, both ends of the polymer optical waveguide film are cut to an angle of 45° relative to optical axes, and the cores with 45° mirror surfaces are exposed.

In this case, the shapes of the cores at the 45° mirror surfaces are flat, with Ra being not more than λ/10. With an 850 μm LED as a light source, excess losses measured for the 45° mirror surfaces are 0.8 dB.

Thus, when the hard cladding portions are provided at the two ends of the polymer optical waveguide film, it is possible to form the 45° mirror surfaces accurately.

EXAMPLE 3

Figure 6:
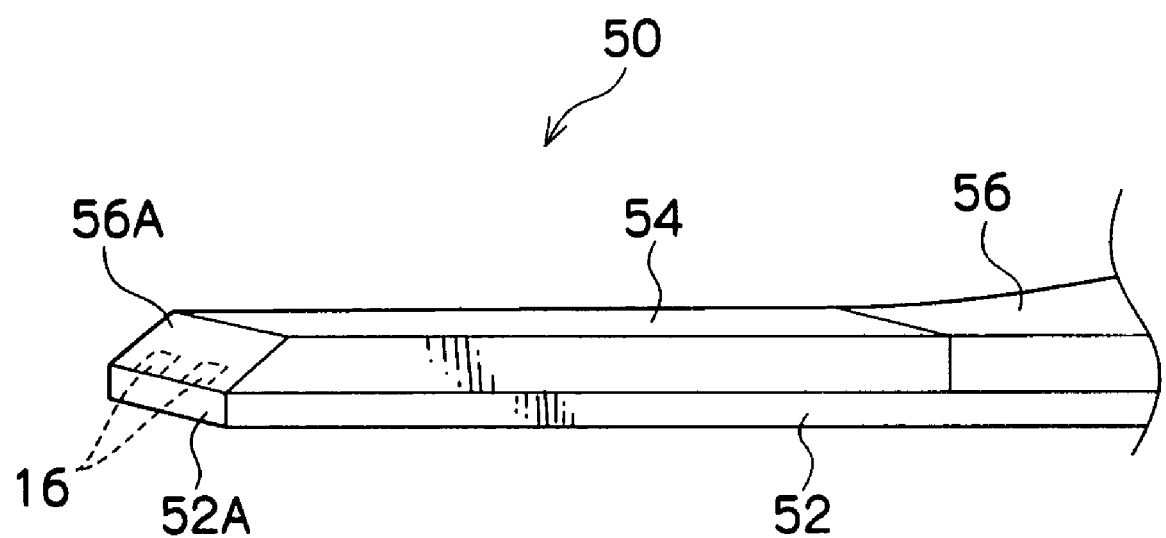
FIG. 6 is a partial perspective view showing the polymer optical waveguide film relating to the first embodiment of the present invention.

First, a polymer optical waveguide film 50, which is provided with hard cladding portions 54 and a soft cladding portion 56 on a cladding film base material 52, is fabricated in the same manner as in Example 1 and, in the same manner as in Example 2, 45° mirror surfaces 56A are formed at end portions of the hard cladding portions 54. Then, the cladding film base material 52 and hard cladding portions 54 are cut orthogonally to the optical axes, at positions 50 μm from distal ends. Thus, as shown in FIG. 6, the polymer optical waveguide film 50 is provided with a 45° mirror surface 56A and an orthogonally cut surface 52A at each of two end portions.

Figure 7:
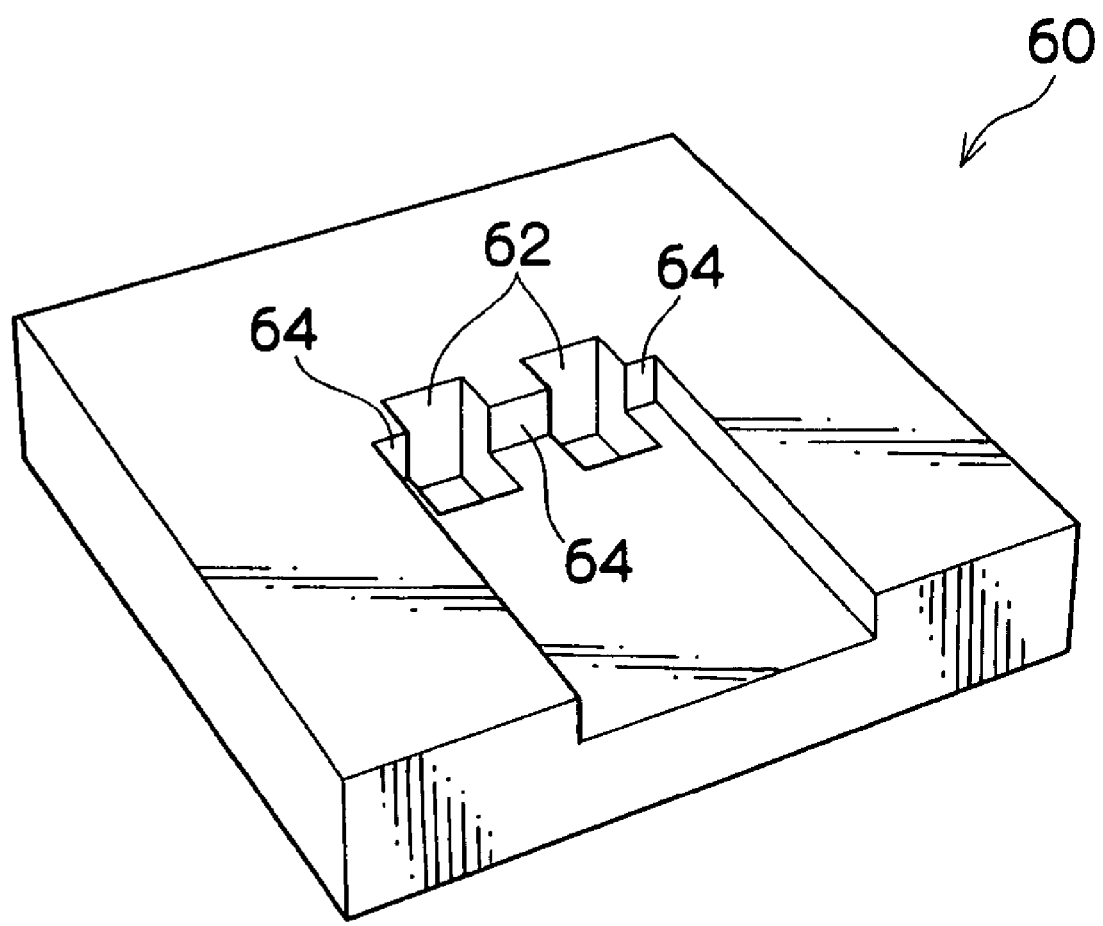
FIG. 7 is a perspective view showing a submount at which the polymer optical waveguide film relating to the first embodiment of the present invention is to be mounted.

Meanwhile, a silicon wafer with thickness 625 μm is formed by an RIE method, to fabricate a silicon submount 60 as shown in FIG. 7. Opening portions 62 and abutting surfaces 64 are formed at the silicon submount 60. The opening portions 62 accommodate a light-reception element and a light-emitting element, and the abutting surfaces 64 are for positioning and mounting of the polymer optical waveguide film.

Figure 8:
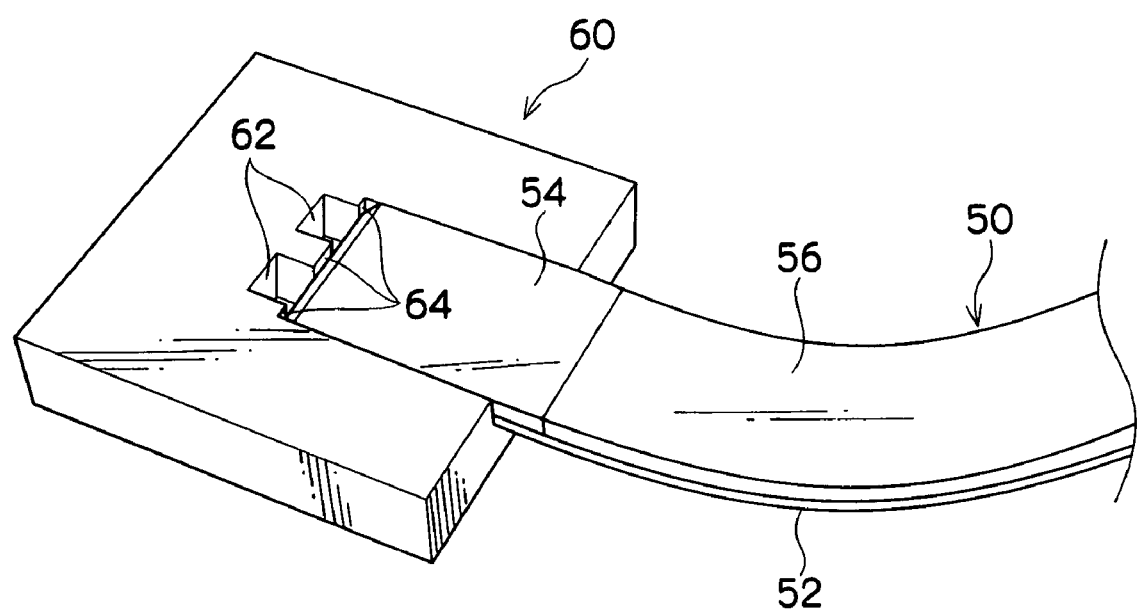
FIG. 8 is a perspective view showing a state in which the polymer optical waveguide film relating to the first embodiment of the present invention is mounted at the submount.

The light-reception element and light-emitting element are mounted at this silicon submount 60, and electrical wiring is performed. Then, using a manual-type bonding machine, the orthogonally cut surface 52A of the polymer optical waveguide film 50 is abutted against the abutting surfaces 64 of the silicon submount 60 as shown in FIG. 8, and the polymer optical waveguide film 50 is positioned at the silicon submount 60. Then, an ultraviolet-curable resin that has been applied beforehand is cured by ultraviolet irradiation, and the polymer optical waveguide film 50 is fixed to the silicon submount 60.

In this case, offsets from ideal mounting positions of the cores are within 5 μm. Furthermore, positions of the cores at end portions of joining faces of the polymer optical waveguide film 50 and separations between the cores do not noticeably change between before and after the mounting.

Next, a polymer optical waveguide film 110 (flexible optical waveguide) relating to a second embodiment of the present invention will be described.

Meanwhile, in the polymer optical waveguide film 110 according to the second embodiment of the invention, explanations of structures, operations, effects and the like that are the same as those of the polymer optical waveguide film 10 according to the first embodiment of the invention may be omitted.

-Polymer Optical Waveguide-

First, structure of the polymer optical waveguide film 110 will be described.

Figure 10:
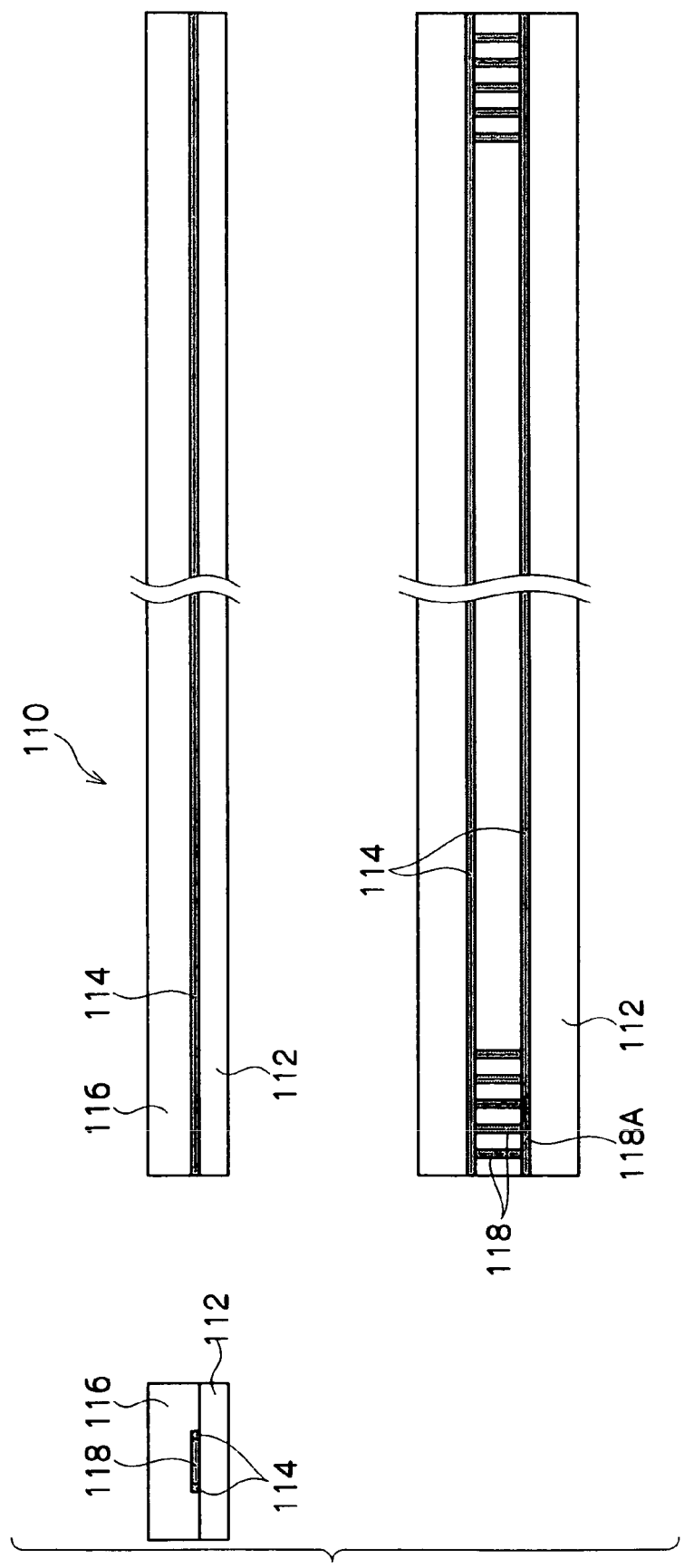
FIG. 10 is a three-way orthographic view showing a polymer optical waveguide film relating to a second embodiment of the present invention.
Figure 11:
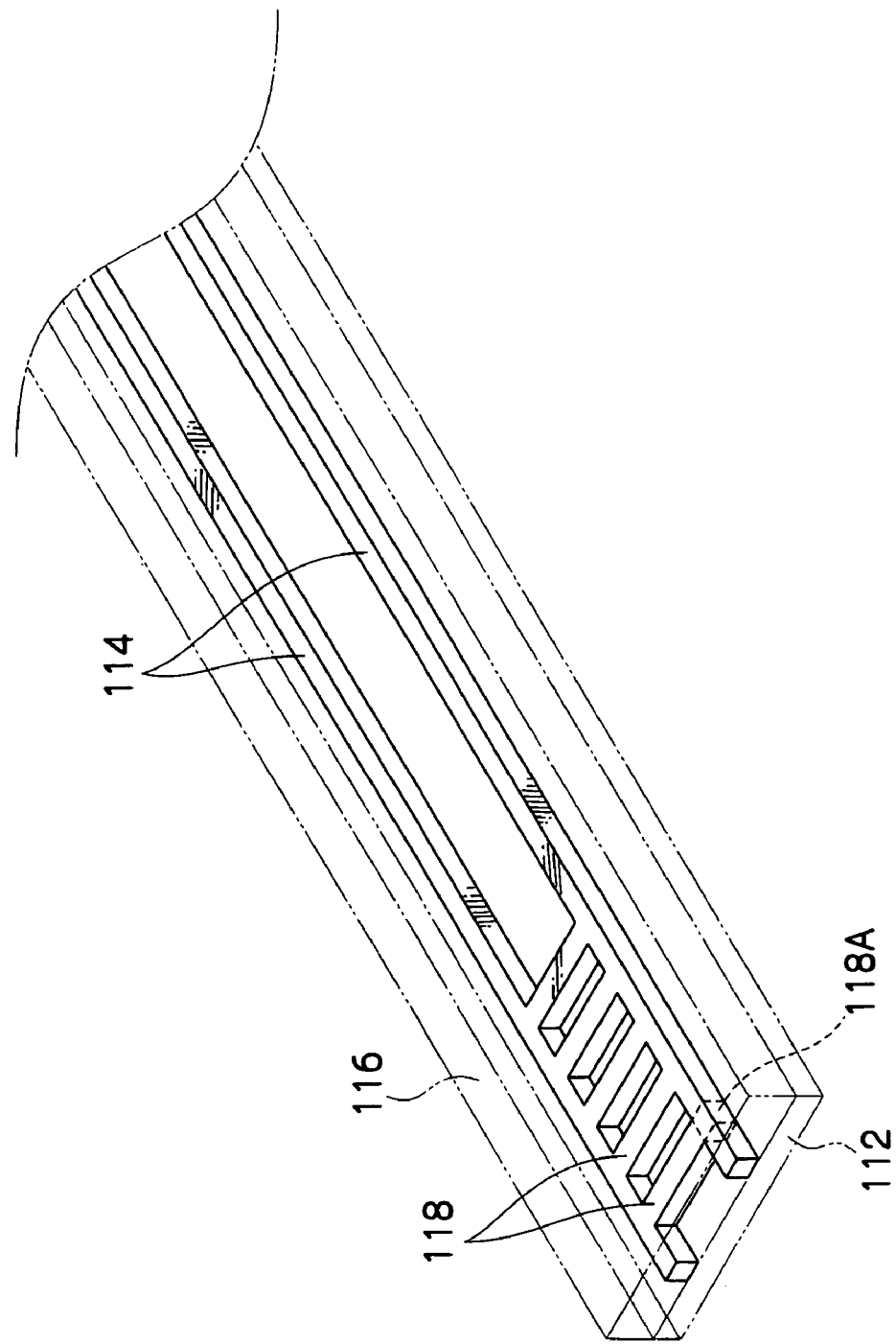
FIG. 11 is a perspective view showing the polymer optical waveguide film relating to the second embodiment of the present invention.

As shown in FIGS. 10 and 11, the polymer optical waveguide film 110 includes a long strip-form cladding film base material 112. Two cores 114 are arranged on the cladding film base material 112 in a row in a width direction of the cladding film base material 112.

Figure 12:
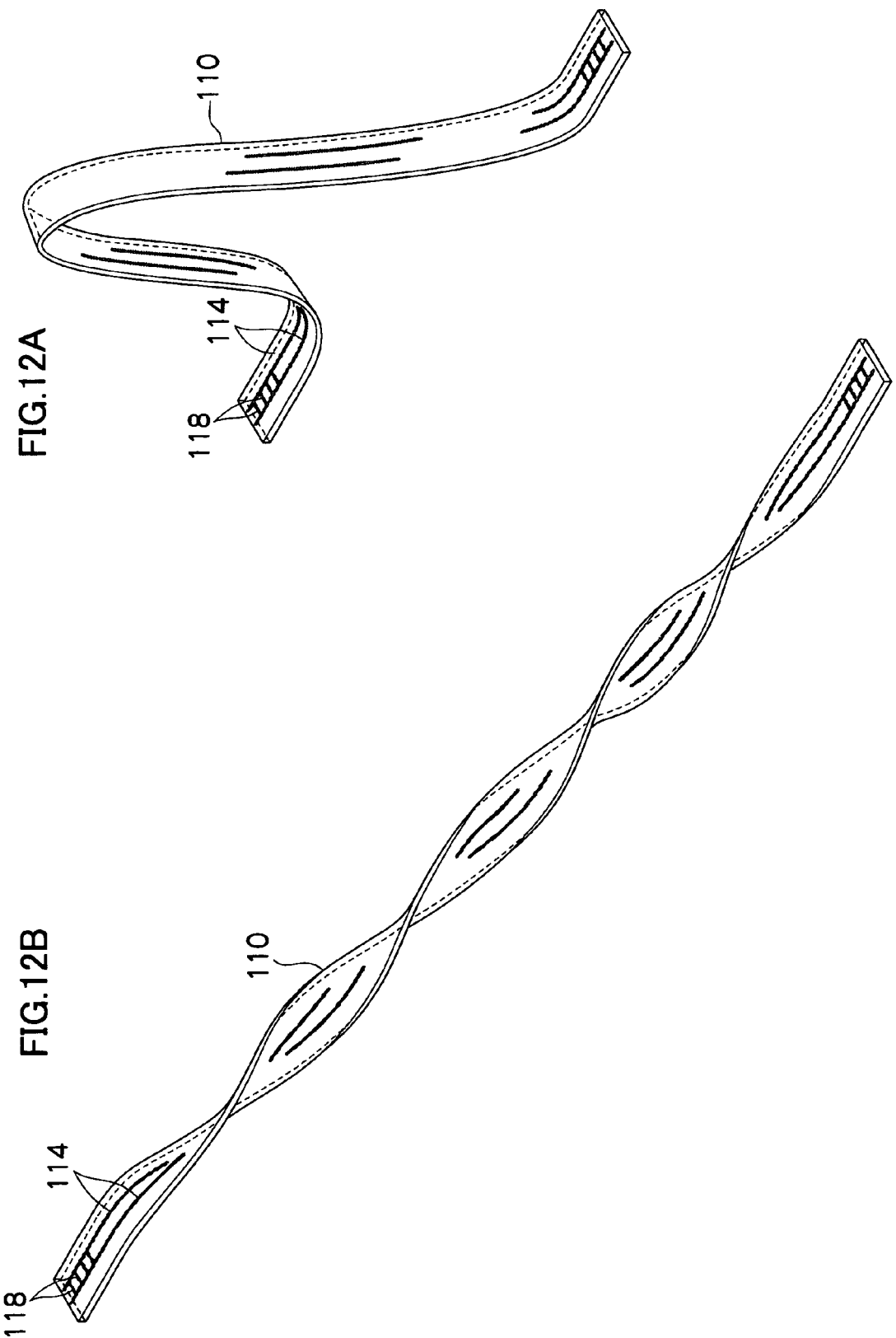
FIGS. 12A and 12B are perspective views showing the polymer optical waveguide film relating to the second embodiment of the present invention.

A cladding portion 116 is also provided on the cladding film base material 112, so as to enclose the cores 114. This cladding portion 116 features flexibility to a radius of curvature of 10 mm or less. Therefore, when the polymer optical waveguide film 110 curves as shown in FIG. 12A and/or twists as shown in FIG. 12B, the polymer optical waveguide film 110 can follow along with such deformations.

Bridging members 118 are provided at a length direction end portions of the cladding portion 116. Each bridging member 118 is formed in a prismic form whose cross-sectional shape is substantially square, and is provided so as to connect between the two cores 114. Thus, the end portion of the cladding portion 116 acts as a reinforced structure.

The bridging members 118 are formed using a material that forms the cores 114, and there is no need to use a particular separate material when the bridging members 118 are provided. In the present embodiment, five of the bridging members 118 are provided at each end.

The material that forms the cores 114 has a flexural modulus of at least 1.0 GPa. Thus, the material that forms the bridging members 118 has a flexural modulus of at least 1.0 GPa. Hence, due to the bridging members 118, even if the polymer optical waveguide film 110 is deformed at a time of pickup or at a time of applying pressure during mounting, shifting of a positional relationship between the cores 114 is restrained.

With the structure described above, when the polymer optical waveguide film 110 is to be mounted at the submount 72 of the light transmission/reception component 70 as shown in FIG. 3, even when the end portion of the polymer optical waveguide film 110 is picked up and pressed against the submount 72, the end portion of the polymer optical waveguide film 110 will not be deformed. Therefore, mispositioning of an alignment mark formed at the end portion of the polymer optical waveguide film 110 and shifting of a positional relationship between the cores 114 at the end portion can be prevented. This leads to a reduction in connection losses, because there is no risk of the cores 114 deforming and axial misalignments occurring.

Moreover, because the cores 114 are linked by the bridging members 118, a cross-sectional area of the cores 114 is larger, and the flexural modulus thereat is larger. Further, because the bridging members 118 and the cores 114 are structured to be disposed in the same plane, it is possible to form the bridging members 118 by the process for forming the cores 114, and the fabrication process of the polymer optical waveguide film 110 is not made complicated.

Now, because the bridging members 118 link with the cores 114, light that is propagated in the cores 114 may be propagated through the bridging members 118 at regions of intersection of the bridging members 118 and the cores 114 (intersection portions 11 8A). Here, if a width of the intersection portions 118A is made 3 times larger than a width of the cores 114, the light propagating in the cores 114 is more likely to propagate into the bridging members 118, and excess losses are increased. On the other hand, if the width of the intersection portions 118A is made 0.3 times smaller than the width of the cores 114, a linking strength with which the cores 114 are joined will be smaller, and a sufficient reinforcement effect (stiffness) will not be provided. Accordingly, in the present embodiment, the width of the intersection portions 118A between the bridging members 118 and the cores 114 is structured so as to be not less than 0.3 times and not more than 3 times the width of the cores 114. Consequently, the polymer optical waveguide film 110 can be provided with a satisfactory reinforcing effect and without excess losses.

Now, if a thickness of the polymer optical waveguide film 110 is smaller than 50 μm, sufficient strength cannot be provided at the end portion of the cladding portion 116, and if the thickness is greater than 500 μm, the cladding portion 116 will not be provided with flexibility. Accordingly, a thickness direction size of the polymer optical waveguide film 110 is set to between 50 μm and 500 μm. Thus, flexibility of the polymer optical waveguide film 110 is assured, and sufficient strength can be provided to the end portions. Further, a width of the polymer optical waveguide film 110 is set to a range of 0.5 mm to 10 mm. Thus, the ability of the polymer optical waveguide film 110 to follow along with deformations is raised. Here, it is preferable if the thickness of the polymer optical waveguide film 110 is set in a range of 100 μm to 200 μm and the width is set in a range of 1 mm to 5 mm.

Figure 13:
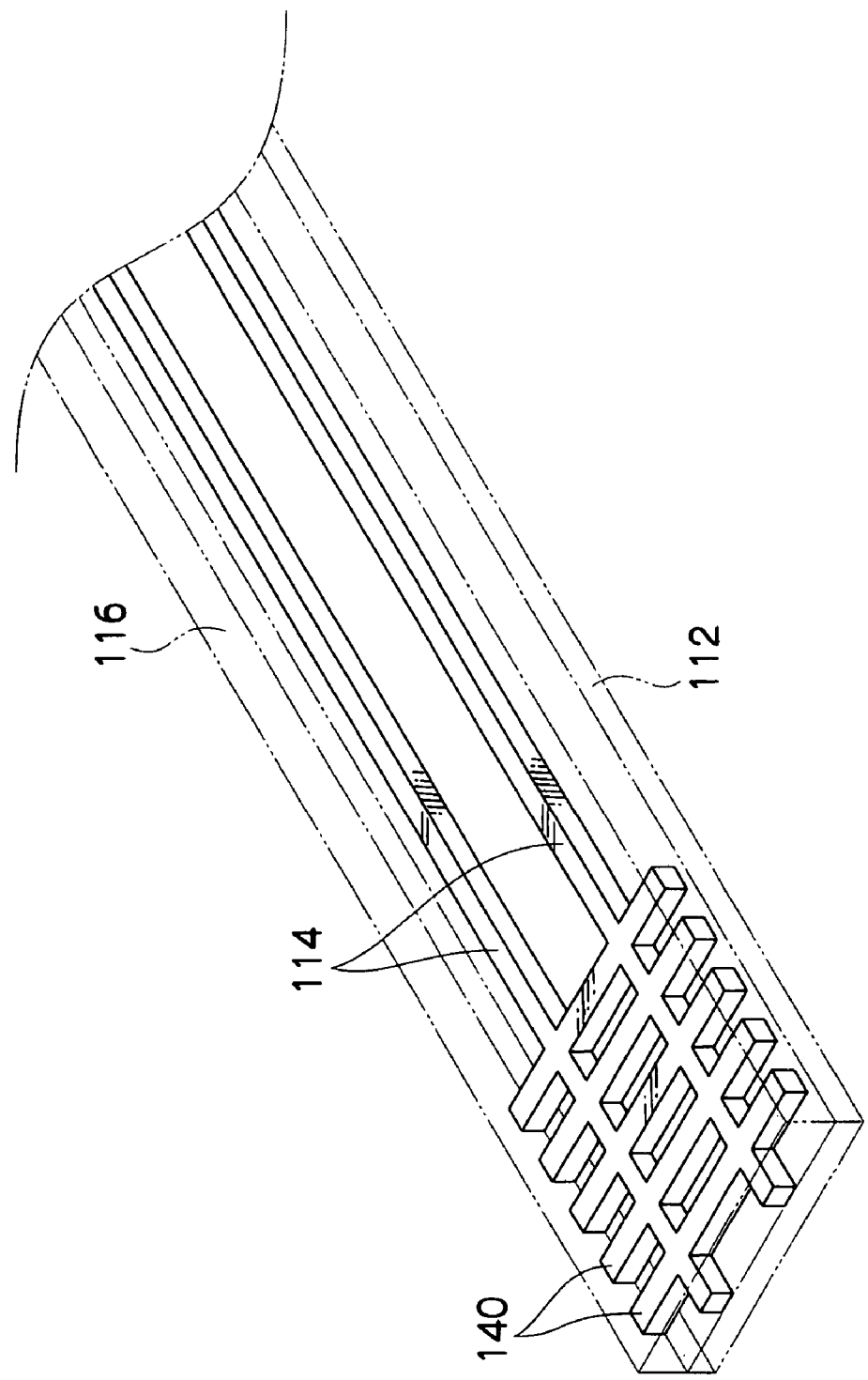
FIG. 13 is a perspective view showing a polymer optical waveguide film of a variant example embodiment of the second embodiment of the present invention.
Figure 14:
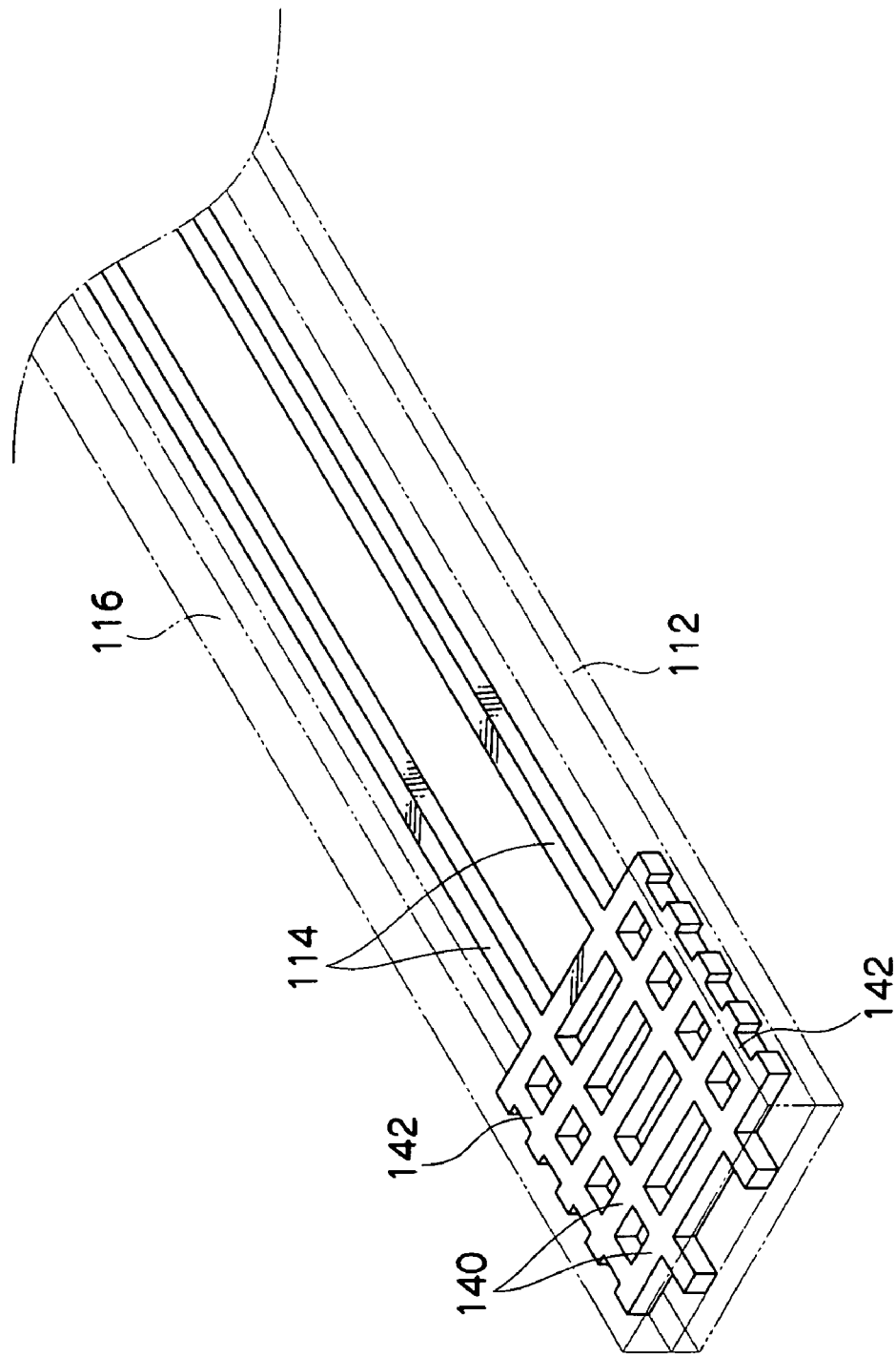
FIG. 14 is a perspective view showing a polymer optical waveguide film of another variant example of the second embodiment of the present invention.
Figure 15:
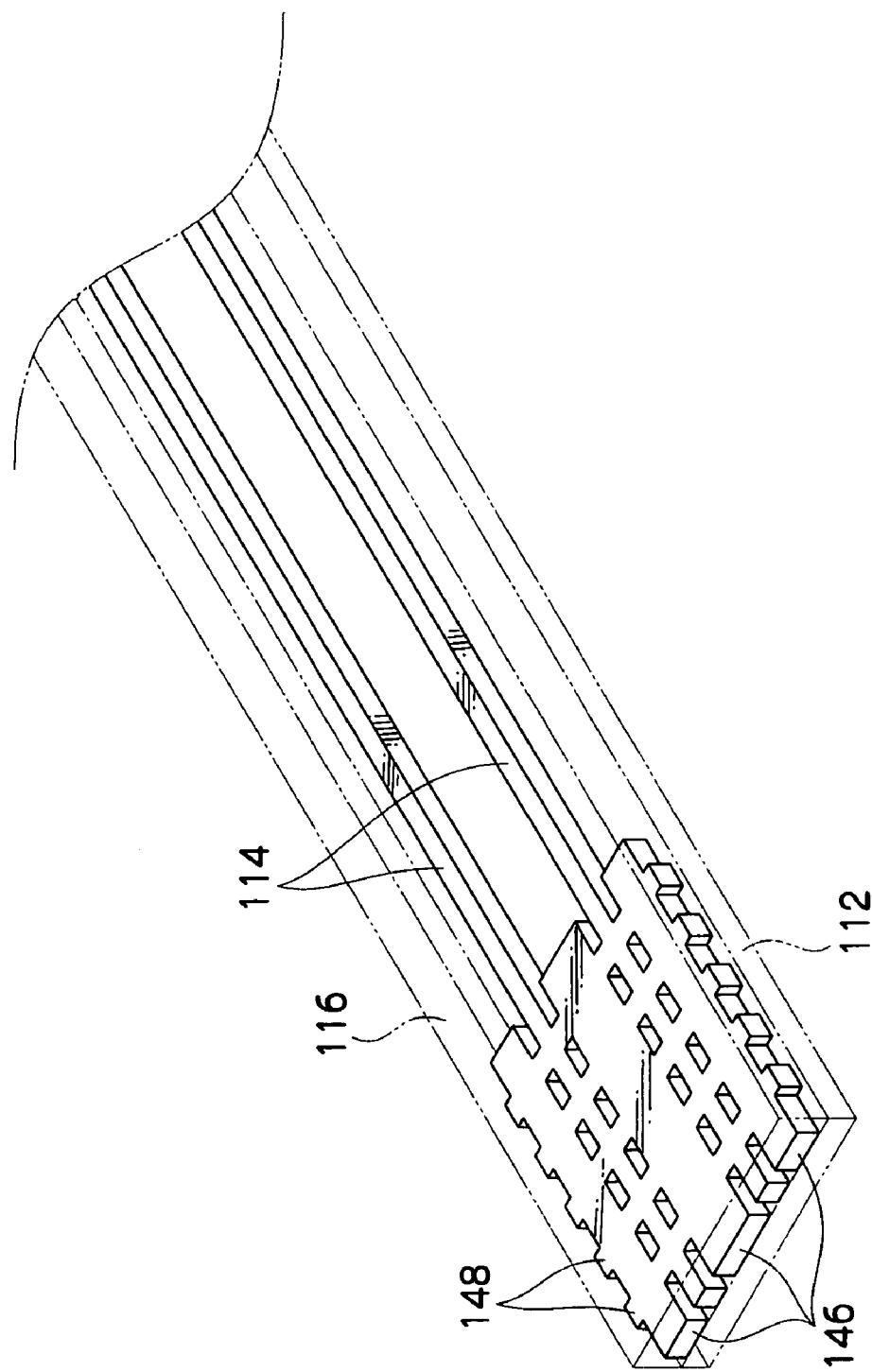
FIG. 15 is a perspective view showing a polymer optical waveguide film of still another variant example of the second embodiment of the present invention.
Figure 16A:
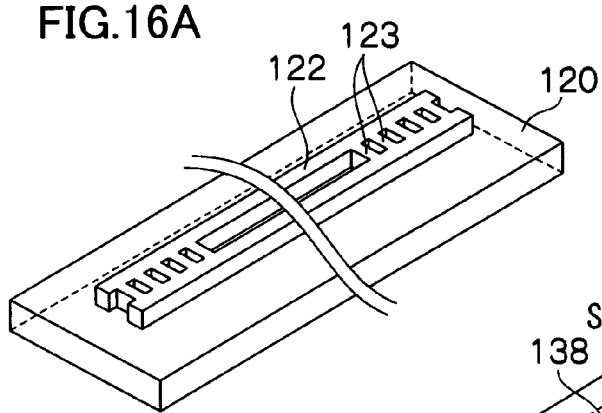
FIGS. 16A, 16B, 16C, 16D, 16E and 16F are perspective views showing a process for fabrication of the polymer optical waveguide film relating to the second embodiment of the present invention.
Figure 16D:
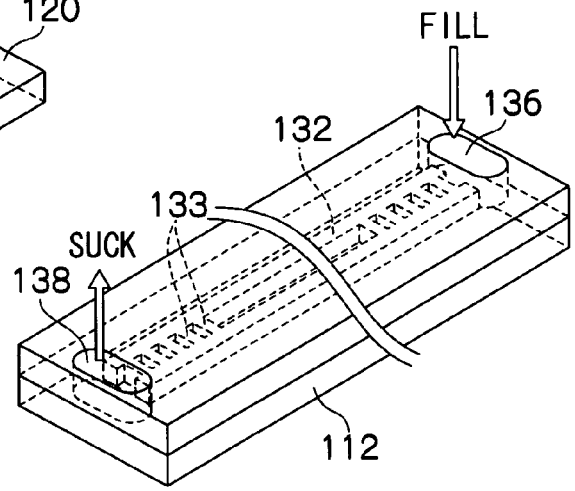
Figure 16B:
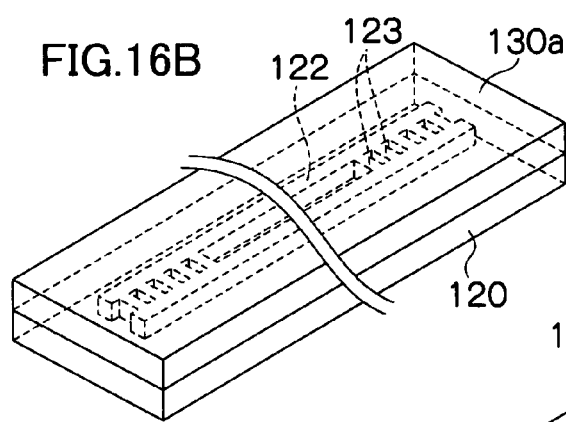
Figure 16E:
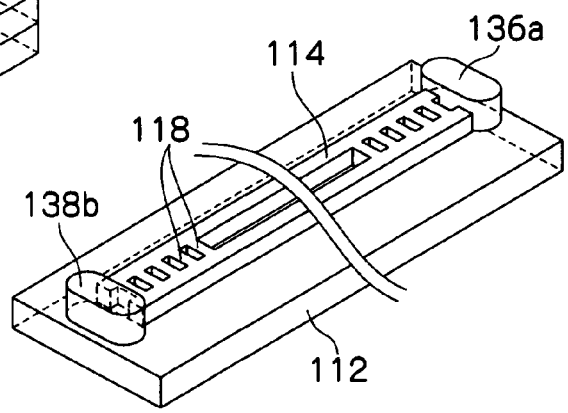
Figure 16C:
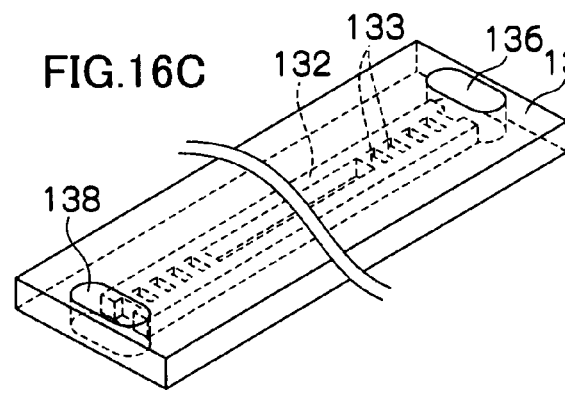
Figure 16F:
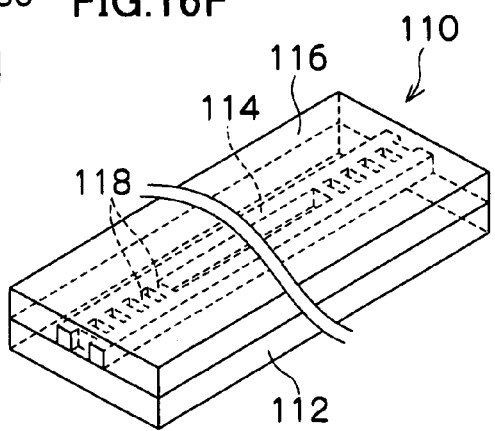

In the present embodiment, as shown in FIG. 11, the bridging members 118 are structured to span between the two cores 114. However, as shown in FIG. 13, end portions of bridging members 140, which are provided so as to link with the two cores 114, may be formed so as to be exposed from end portions of the cladding portion 116. Further, as shown in FIG. 14, alignment marks 142 may be provided in the cladding portion 116 to be parallel with end portions of the cores 114, and bridging members 140 may link the alignment marks 142 with the two cores. Further again, as shown in FIG. 15, flat plate-form bridging members 146 may be respectively provided between the two cores 114 and between the cores 114 and side walls of the cladding portion 116, and the bridging members 146 and the cores 114 may be linked in a direction intersecting the length direction of the polymer optical waveguide film 110 by bridging members 148. Further still, although not illustrated, reinforcing members may be embedded in the end portion of the polymer optical waveguide film 110 in a state in which the cores 114 are not linked, thus forming a structure which reinforces the end portion of the polymer optical waveguide film 110.

FIGS. 16A to 16F show a process for fabrication of the polymer optical waveguide film 110 (a flexible optical waveguide) of the second embodiment.

In the process for fabrication of the second embodiment, it is different from the process for fabrication of the first embodiment that the bridging members 118 are formed. Accordingly, in the process for fabrication of the first embodiment, the protrusion portions 22 on the master 20 correspond to the cores 16. However, in the process for fabrication of the second embodiment, protrusion portions 122 on the master 120 correspond to the cores 114, further, protrusion portions 123 on the master 120 correspond to the bridging members 118. Accordingly, in the process for fabrication of the second embodiment, the protrusion portions 122 on the master 120 correspond to recesses 132 of a mold 130, and the protrusion portions 123 on the master 120 correspond to recesses 133 of the mold 130. That is, a curable resin for core (bridging member) formation is filled into the recess portions 132 and 133 to form the cores 114 and the bridging members 118 in the similar process for fabrication of the first embodiment.

Furthermore, in "5) A step of forming the cladding portion 11 constituted by the hard cladding portions 14 and the soft cladding portion 12 on the cladding film base material 18 at which the cores 16 have been formed" of the process for fabrication of the first embodiment, as shown in FIGS. 5F-5I, the cladding portion 11 constituted by the hard cladding portions 14 and the soft cladding portion 12 is formed on the cladding film base material 18 at which the cores 16 have been formed. However, instead of this, in the process for fabrication of the second embodiment, as a "step of forming the cladding portion 116 on the cladding film base material 112 at which the cores 114 and the bridging members 118 have been formed", the cladding portion 116 is formed on the cladding film base material 112 at which the cores 114 and the bridging members 118 have been formed. That is, the protective mask is not used.

In other respects, the process for fabrication of the second embodiment is similar to the first embodiment, with the steps for fabrication of the first embodiment shown in FIGS. 5A, 5B, 5C, 5D, 5E and 5J corresponding to the steps for fabrication of the second embodiment shown in FIGS. 16A, 16B, 16C, 16D, 16E and 16F, respectively. That is, in those Figures, the polymer optical waveguide film 10 corresponds to the polymer optical waveguide film 110, the cladding film base material 18 corresponds to the cladding film base material 112, the cores 16 correspond to the cores 114, the master 20 corresponds to the master 120, the protrusion portions 22 correspond to the protrusion portions 122, the mold 30 corresponds to the mold 130, the curable resin layer 30a corresponds to the curable resin layer 130a, the recess portions 32 correspond to recess portions 132, the inflow aperture 36 corresponds to the inflow aperture 136, the outflow aperture 38 corresponds to the outflow aperture 138, the resin portions 36a and 38a, correspond to the resin portions 36a and 38b. Accordingly, the process for fabrication of the polymer optical waveguide film 110 of the second embodiment will not be described in detail.

Below, the second embodiment will be concretely described by Examples 4 to 6. Note that the present invention is not limited by these Examples 4 to 6.

EXAMPLE 4

-Fabrication of Master-

By a similar manner as in Example 1, two protrusion portions for cores with square cross-sections (width 50 μm, height 50 μm, length 80 mm) are formed, and five protrusion portions for bridging members which link the core protrusion portions at each of two ends in the length direction (width 50 μm, height 50 μm) are formed. Here, a distance between the two protrusion portions is set to 250 μm and distances between the five bridging member protrusion portions are set to 500 μm.

-Fabrication of Mold-

Fabrication is performed by the same process as in Example 1.

-Fabrication of Cladding Film Base Material and Cores-

Fabrication is performed by the same process as in Example 1.

-Fabrication of Cladding Portion-

Fabrication is performed by the same process as in Example 1.

Here, a light source (manufactured by Advantest Corporation) and a light detector (manufactured by Ando Electric Co., Ltd.) are used to perform a measurement of insertion losses of the polymer optical waveguide film that has been fabricated. Insertion losses in such a case are 1.6 dB for each of the two cores 114.

A silicon substrate is prepared with length 5 mm and width 5 mm, at which a '+'-form alignment mark with a width of 5 μm is formed, and a verification of mounting accuracy of the fabricated polymer optical waveguide film is carried out. Using a die-bonder which has a mounting accuracy of ±1 μm in an unloaded state, the polymer optical waveguide film is mounted on the silicon substrate with passive alignment by image verification. With a bonding load of 6 N, an ultraviolet-curable resin that has been applied beforehand is cured by ultraviolet radiation, and the polymer optical waveguide film is adhered onto the silicon substrate.

When a mounting accuracy verification is carried out ten times, a maximum value of offsets from ideal mounting positions of the cores is 3.5 μm. Furthermore, positions of the cores at end portions of joining faces of the polymer optical waveguide film and separations between the cores do not noticeably change between before and after the mounting.

EXAMPLE 5

First, a polymer optical waveguide film is prepared in the same manner as in Example 4. Here, width of the bridging members 140 is set to 150 μm.

When incidence losses of this polymer optical waveguide film are measured in the same manner as in Example 4, insertion losses are 2.7 dB for each of the two cores.

Further, when mounting accuracy verification is carried out ten times in the same manner as in Example 4, a maximum value of offsets from ideal mounting positions of the cores is 2.0 µm. Furthermore, positions of the cores at end portions of joining faces of the polymer optical waveguide film and separations between the cores do not noticeably change between before and after the mounting.

EXAMPLE 6

First, a polymer optical waveguide film is prepared in the same manner as in Example 4. In this case, as shown in FIG. 15, the flat plate-form bridging members 146 are formed between the two cores and between the cores and end faces of the cladding portion, with length 5 mm and width 400 µm, and the bridging members 148, with width 50 µm, integrally join the cores 114 with the bridging members 146.

When incidence losses of this polymer optical waveguide film are measured in the same manner as in Example 4, insertion losses are 1.5 dB for each of the two cores.

Further, when mounting accuracy verification is carried out ten times in the same manner as in Example 4, a maximum value of offsets from ideal mounting positions of the cores is 2.0 µm. Furthermore, positions of the cores at end portions of joining faces of the polymer optical waveguide film and separations between the cores do not noticeably change between before and after the mounting.

In the second aspect, at least 70% of a cross-sectional area of a second cladding portion may be formed by a hard material with a higher flexural modulus.

When 70% or more of the cross-sectional area of the second cladding portion is structured by the hard material with the higher flexural modulus, it is possible to provide a strength that will not be deformed at a time of pickup by pressure, during joining or the like.

Further, in the first or second aspect, the second cladding portion may be provided at both ends, in a direction of propagation of light, of a first cladding portion.

When the second cladding portion is provided at both ends of the first cladding portion, it is possible to mount objects of mounting to both ends of the flexible optical waveguide, with high accuracy.

Further, in the second aspect, the second cladding portion may have a flexural modulus of at least 0.5 GPa.

When the flexural modulus of the second cladding portion is 0.5 GPa or more, there is no risk of the second cladding portion deforming even when the second cladding portion is pressured at a time of mounting to an object of mounting. Therefore, mounting accuracy of the flexible optical waveguide will be stable.

Further, in the second aspect, the first cladding portion may include flexibility with an allowable radius of curvature of 10 mm or less.

When the first cladding portion is formed by a member featuring flexibility to an allowable radius of curvature of 10 mm or less, the first cladding portion will follow along with deformations when the first cladding portion curves or twists. Therefore, there is no risk of the core(s) surrounded by the first cladding portion being damaged.

Further, in the second aspect, a thickness direction size of the cladding portion may be between 50 µm and 500 µm.

If a thickness direction size of the cladding portion is set smaller than 50 µm, it will not be possible to provide the second cladding portion with sufficient strength, and if the thickness direction size of the cladding portion is set larger than 500 µm, flexibility of the first cladding portion will not be provided. Thus, when the thickness direction size of the cladding portion is set from 50 µm to 500 µm, it is possible to assure flexibility of the first cladding portion and provide adequate strength at the second cladding portion.

Further, in the second aspect, the core may have been fabricated using a mold fabricated of silicon resin.

When the core is reproduced using a mold made of silicon resin, close-contact characteristics and separation characteristics for material flowed into the mold are good. Therefore, recesses and protrusions formed at the mold are accurately transferred to the material that has flowed into the mold, and mold-release problems when the material is removed do not occur. Consequently, the core will be fabricated with high accuracy.

Further, in the second aspect, a 45° mirror surface may be formed at the second cladding portion, for bending a direction of progress of light through 90°.

When the 45° mirror surface is formed at the second cladding portion, it is possible to bend the direction of progress of light progressing through the core(s) surrounded by the second cladding portion through 90°. In other words, it is possible to implement a 90° light path alteration.

Further still, in a fourth aspect, a reinforcing member may be formed of a material which forms a core.

When the reinforcing member is formed using the material that forms the core(s), there is no need to use a particular separate material for forming the reinforcing member.

Further, in the fourth aspect, the reinforcing member may include a projecting portion which projects from the core in a width direction.

The projecting portion which serves as the reinforcing member projects in a width direction from the core. Thus, a cross-sectional area at the core is made larger, and flexing strength is increased. Furthermore, because the projecting portion is formed in the same plane as the core(s), it is possible to form the reinforcing member simultaneously with a process for forming the core, and a fabrication process is not made complicated.

Further, in the fourth aspect, the cores are arranged in a row, and the reinforcing member includes a bridging portion which links between the cores.

When the cores are arranged in a row, the cores are linked by the bridging portion. Hence, even when the cladding portion surrounding the cores is pressured, a spacing between the cores is always kept constant by the bridging portion, and there will be no shifts in a positional relationship between the cores. Thus, accuracy of the spacing between the cores is assured.

Further, in the fourth aspect, the reinforcing member may link the core with an alignment mark which is embedded in the cladding portion alongside the core.

When the alignment mark, for positioning when mounting at an object of mounting, is embedded in the cladding portion alongside the core, the core is linked with the alignment mark by the reinforcing member. Hence, a positional relationship between the alignment mark and the core will not shift even when the cladding portion is pressured, and positional accuracy is assured.

Further, in the fourth aspect, a width of a portion of intersection of the bridging portion with the core is at least 0.3 times and at most 3 times a width of the core.

If the width of intersection portions between the bridging portion and the cores is smaller than 0.3 times the width of the core, a linking strength with which the cores are linked will be small, and a sufficient reinforcement effect will not be provided. Further, if the width of the intersection portions is greater than 3 times the width of the cores, light that is propagating in the cores will propagate into the reinforcing member, and consequently excess losses of light will increase. Accordingly, the widths of the intersection portions between the bridging portion and the cores are set to be not less than 0.3 times and not more than 3 times the widths of the cores. Thus, a flexible optical waveguide featuring a satisfactory reinforcing effect and with low excess losses of light can be provided.

Further, in the fourth aspect, the reinforcing member may be provided at both ends, in a direction of propagation of light, of the cladding portion.

When the reinforcing member(s) is/are provided at each of the two ends of the cladding portion, it is possible to mount the two ends of the flexible optical waveguide to objects of mounting with high accuracy.

Further, in the fourth aspect, a material which forms at least one of the core and the reinforcing member may have a flexural modulus of at least 1.0 GPa.

When the core(s) and/or the reinforcing member(s) are formed with a material with a flexural modulus of 1.0 GPa or more, deformation of the cores and the reinforced cladding portion by pressure is restrained, and consequently a positional relationship of the cores is retained.

Further, in the fourth aspect, the cladding portion may include flexibility with an allowable radius of curvature of 10 mm or less.

When the cladding portion is formed by a member featuring flexibility to an allowable radius of curvature of 10 mm or less, then when the cladding portion where the reinforcing member is not provided curves or twists, the cladding portion will follow such deformations, and there is no risk of the core surrounded by the cladding portion being damaged.

Further, in the fourth aspect, a thickness direction size of the cladding portion may be between 50 μm and 500 μm.

If a thickness direction size of the cladding portion is set smaller than 50 μm, it will not be possible to provide the cladding portion with sufficient strength, and if the thickness direction size of the cladding portion is set larger than 500 μm, flexibility of the cladding portion will not be provided. Thus, when the thickness direction size of the cladding portion is set from 50 μm to 500 μm, it is possible to assure flexibility of the cladding portion and provide adequate strength at the end portion.

Further, in the fourth aspect, the core may have been fabricated using a mold fabricated of silicon resin.

When the core is reproduced using a mold made of silicon resin, close-contact characteristics and separation characteristics for material flowed into the mold are good. Therefore, recesses and protrusions formed at the mold are accurately transferred to the material that has flowed into the mold, and mold-release problems when the material is removed do not occur. Consequently, the core will be fabricated with high accuracy.

What is claimed is:

1. A flexible optical waveguide comprising:
    a core in which light propagates; and
    a cladding portion with a smaller refractive index than the core, which surrounds the core,
    wherein the cladding portion includes
        a soft first cladding portion, and
        a hard second cladding portion, that is provided at at least one end portion, in a direction of propagation of light, of the first cladding portion and that has a higher flexural modulus than the first cladding portion.

2. The flexible optical waveguide of claim 1, wherein at least 70% of a cross-sectional area of the second cladding portion is formed by a hard material with the higher flexural modulus.

3. The flexible optical waveguide of claim 1, wherein the second cladding portion is provided at both ends, in the direction of propagation of light, of the first cladding portion.

4. The flexible optical waveguide of claim 1, wherein the second cladding portion has a flexural modulus of at least 0.5 GPa.

5. The flexible optical waveguide of claim 1, wherein the first cladding portion has flexibility with an allowable radius of curvature of 10 mm or less.

6. The flexible optical waveguide of claim 1, wherein a thickness direction size of the cladding portion is between 50 μm and 500 μm.

7. The flexible optical waveguide of claim 1, wherein the core is fabricated using a mold fabricated of silicon resin.

8. The flexible optical waveguide of claim 1, wherein a 45° mirror surface is formed at an end portion of the second cladding portion, for bending a direction of progress of light through 90°.

9. A flexible optical waveguide comprising:
    a core in which light propagates;
    a cladding base material with a smaller refractive index than the core, on which the core is disposed; and
    a cladding portion with a smaller refractive index than the core, that is provided on the cladding base material and encloses a perimeter of the core,
    wherein the cladding portion includes
        a first cladding portion, that is structured by a soft cladding material, and
        a second cladding portion, that is provided at at least one end portion, in a direction of propagation of light, of the first cladding portion and that is structured by a hard cladding material having a higher flexural modulus than the cladding material that structures the first cladding portion.

10. A flexible optical waveguide comprising:
    a core in which light propagates;
    a cladding portion with a smaller refractive index than the core, that surrounds the core; and
    a reinforcing member for reinforcing at least one of the cladding portion and the core, the reinforcing member being embedded in the cladding portion at at least one end portion thereof in a direction of propagation of light.

11. The flexible optical waveguide of claim 10, wherein the reinforcing member is formed of a material that forms the core.

12. The flexible optical waveguide of claim 10, wherein the reinforcing member is a projecting portion that projects from the core in a width direction.

13. The flexible optical waveguide of claim 10, wherein a plurality of cores are arranged in a row, and the reinforcing member is a bridging portion that links between the arranged cores.

14. The flexible optical waveguide of claim 10, wherein the reinforcing member links the core with an alignment mark that is embedded in the cladding portion alongside the core.

15. The flexible optical waveguide of claim 13, wherein a width of a portion of intersection of the bridging portion with the core is at least 0.3 times and at most 3 times a width of the core.

16. The flexible optical waveguide of claim 10, wherein the reinforcing member is provided at both ends, in the direction of propagation of light, of the cladding portion.

17. The flexible optical waveguide of claim 10, wherein a material that forms at least one of the core and the reinforcing member has a flexural modulus of at least 1.0 GPa.

18. The flexible optical waveguide of claim 10, wherein the cladding portion has flexibility with an allowable radius of curvature of 10 mm or less.

19. The flexible optical waveguide of claim 10, wherein a thickness direction size of the cladding portion is between 50 μm and 500 μm.

20. The flexible optical waveguide of claim 10, wherein the core is fabricated using a mold fabricated of silicon resin.

* * * * *